US011237779B2

United States Patent
Oikawa et al.

(10) Patent No.: US 11,237,779 B2
(45) Date of Patent: Feb. 1, 2022

(54) MESSAGE PROVIDING APPARATUS AND NON-TRANSITORY COMPUTER READABLE MEDIUM

(71) Applicant: FUJIFILM Business Innovation Corp., Tokyo (JP)

(72) Inventors: Shiori Oikawa, Kanagawa (JP); Shigeo Miyata, Kanagawa (JP); Hiroyuki Mitsuhashi, Kanagawa (JP); Yu Mishima, Kanagawa (JP); Xiaojing Zhang, Kanagawa (JP); Hideaki Sugimoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 195 days.

(21) Appl. No.: 16/351,866

(22) Filed: Mar. 13, 2019

(65) Prior Publication Data
US 2019/0294394 A1   Sep. 26, 2019

(30) Foreign Application Priority Data

Mar. 20, 2018 (JP) .............................. JP2018-052675
May 17, 2018 (JP) .............................. JP2018-095651

(51) Int. Cl.
G06F 3/12 (2006.01)
H04L 12/58 (2006.01)
H04L 29/06 (2006.01)

(52) U.S. Cl.
CPC .......... *G06F 3/1238* (2013.01); *G06F 3/1204* (2013.01); *G06F 3/1257* (2013.01); *H04L 51/02* (2013.01); *H04L 63/104* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 2003/0220972 A1* | 11/2003 | Montet | H04L 51/04 709/204 |
| 2014/0244769 A1 | 8/2014 | Sakuta et al. | |
| 2015/0350194 A1* | 12/2015 | Gilpin | H04L 63/102 726/8 |
| 2018/0083894 A1* | 3/2018 | Fung | H04L 51/046 |
| 2018/0109526 A1* | 4/2018 | Fung | H04L 63/168 |
| 2019/0171845 A1* | 6/2019 | Dotan-Cohen | H04L 63/102 |

FOREIGN PATENT DOCUMENTS

JP          2014-164522 A         9/2014

* cited by examiner

*Primary Examiner* — Thomas D Lee
(74) *Attorney, Agent, or Firm* — Sughrue Mion, PLLC

(57) ABSTRACT

There is provided a message providing apparatus including a receiver configured to receive a service request message for a software robot program that operates on a message service exchanging messages between users and that exchanges messages with the users, a usage right granting unit configured to grant a usage right to a user who has performed a specific operation on the software robot program, a permission information providing unit configured to provide service permission information to the user to whom the usage right is granted, and a controller configured to, when the receiver receives the service request message, control execution and non-execution of a service according to presence or absence of the service permission information associated with the service request message.

18 Claims, 36 Drawing Sheets

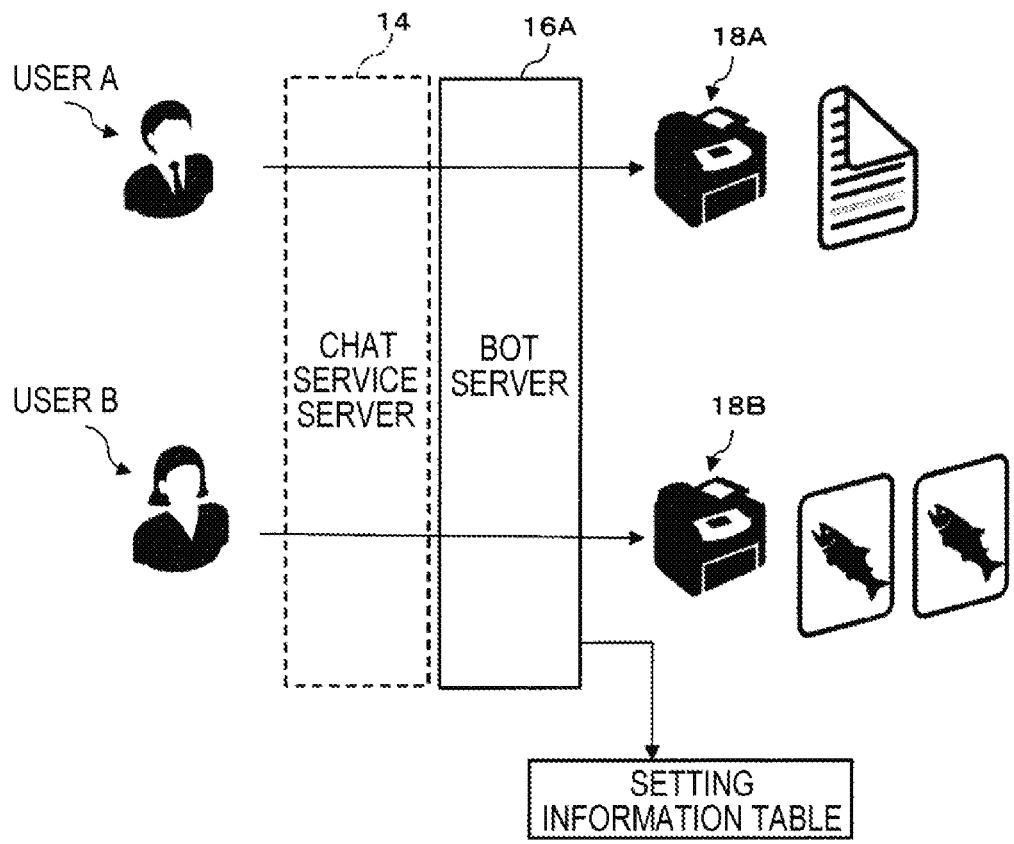

MESSAGE PROVIDING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-095651 filed May 17, 2018 and Japanese Patent Application No. 2018-052675 filed Mar. 20, 2018.

BACKGROUND

Technical Field

The present disclosure relates to a message providing apparatus and a non-transitory, computer readable medium.

SUMMARY

A software robot that executes a specific process based on contents posted by a user on a chat (hereinafter, referred to as a chatbot) is known.

Here, a case is considered where a chatbot is instructed to execute a specific process on a group chat which is a chat in which plural users participate. In this case, when a user who does not have a right to instruct execution of the process or a user who is unrelated to the execution of the process is included in the participants of the group chat, it is not desirable to perform the same operation as that performed when an execution instruction is received on a chat having one user, as the operation of the chatbot.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to a first aspect of the present disclosure, there is provided a message providing apparatus including a receiver configured to receive a service request message for a software robot program that operates on a message service exchanging messages between users and that exchanges messages with the users, a usage right granting unit configured to grant a usage right to a user who has performed a specific operation on the software robot program, a permission information providing unit configured to provide service permission information to the user to whom the usage right is granted, and a controller configured to, when the receiver receives the service request message, control execution and non-execution of a service according to presence or absence of the service permission information associated with the service request message.

BRIEF DESCRIPTION OF THE DRAWINGS

Exemplary embodiment(s) of the present disclosure will be described in detail based on the following figures; wherein:

FIG. 4 is a view for explaining setting information registration according to the first exemplary embodiment;

FIG. 5 is a view for explaining a setting information table;

DETAILED DESCRIPTION

Hereinafter, exemplary embodiments of the present disclosure will be described with reference to the accompanying drawings by way of an example of a chatbot that provides a print service according to a message from a user.

First Exemplary Embodiment

Figure 1:
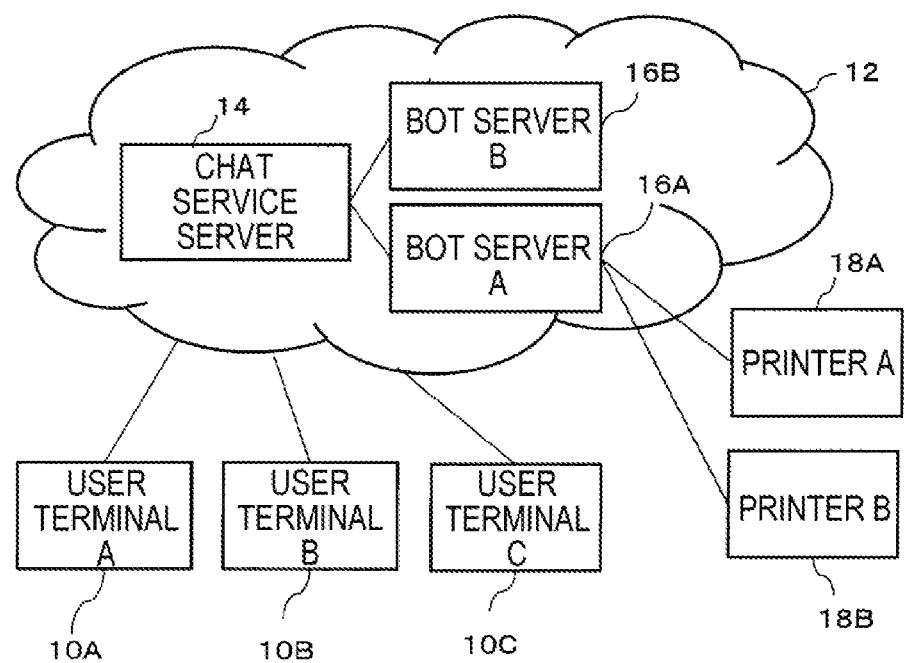
FIG. 1 is a system configuration diagram according to a first exemplary embodiment.

FIG. 1 is an overall configuration diagram of a message service system according to a first exemplary embodiment. The message service system includes user terminals A (10A) to C (10C), a chat service server 14, hot servers A (16A) and B (16B), and printers A (18A) and B (18B).

The user terminals A (10A) to C (10C) are information terminals used by users of the message service. Examples of the user terminals A (10A) to C (10C) include a smartphone, a tablet terminal, and a personal computer (PC). Three user terminals A (10A), B (10B), and C (10C) are illustrated in FIG. 1. It should be noted that the number of user terminals is selected freely, and may be smaller or larger than three. The users operate the user terminals A (10A) to C (10C) to access the chat service server 14 on a cloud 12 and exchange messages with other users and chatbots. In the following description, it is assumed that a user A operates the user terminal A, a user B operates the user terminal B, and a user C operates the user terminal C. The user terminals A (10A) to C (10C) and the chat service server 14 are connected so as to be able to exchange data via a wired or wireless communication network. An example of the communication network is a public line such as the Internet. The communication network may be a dedicated line.

The chat service server 14 is a cloud server provided on the cloud 12 that provides a chat service. The chat service server 14 is implemented by one or more server computers. The chat service server 14 executes overall processing related to message exchange, such as a message transmission and reception process for the user terminals A to C and a process of displaying screens for message transmission and reception. In addition to processing messages exchanged between two users, the chat service server 14 may create a group including three or more users and process message exchange within the group (group chat). Further, the chat service server 14 cooperates with the bot server A (16A) and the bot server B (16B) to process message exchange for chatbots provided by the bot servers 16A and 16B The exchange of messages between a user and a chatbot includes message exchange between one user and a chatbot, and message exchange between plural users and a chatbot.

The bot server A (16A) and the bot server B (16B) serve as message providing apparatuses in the present exemplary embodiment. Software robot programs of chatbots that exchange messages with users are installed in the bot server A (16A) and the hot server B (16B), and the hot server A (16A) and the bot server B (16B) execute the software robot programs. These hot servers A (16A) and B (163) may be operated by respective messenger service accounts allocated for advertisement or commercial use, such as companies and shops. The hot server A (16A) and the hot server B (16B) cooperate with the chat service server 14 via a specific Application Programming Interface (API) to exchange messages with a user and return a message in automatic response to a message from the user. The specific API is an API for using the chat service server 14. The format of the API may be any format. For example, the API has a Javascript Object Notation (JSON) format, JSON data of a prescribed format is transmitted to a specific URL of the chat service server 14 by POST or GET, and a result is returned as data in the JSON format.

When an operation instruction is included in a message from a user, the hot server A (16A) and the hot server B (16B) execute specific service contents according to the operation instruction. In the present exemplary embodiment, when a print instruction is included in the message from the user, the hot server A (16A) serves as a "print bot" that operates the printer A (18A) or the printer B (18B) according to the print instruction and perform a print process. The bot server 16B may provide any other service according to the operation instruction from the user. In FIG. 1, the two hot servers A (16A) and B (16B) are illustrated. The number of the bot servers may be selected freely. One hot server may constitute plural chatbots. Alternatively, plural bot servers may constitute one chatbot.

The hot server A serving as a chatbot (or a print hot) drives the printer A or the printer B according to setting information about an operation of the software robot program to execute the print process. The setting information is registered in advance for each user. The setting information may also be referred to as an operation condition to operate the printer A or the printer B. The user A operates the user terminal A to input and register the setting information to operate the printer A. The user B operates the user terminal B to input and register the setting information to operate the printer B.

The printer A (18A) and the printer B (18B) execute an image print process in response to a command from the bot server A.

Figure 2:
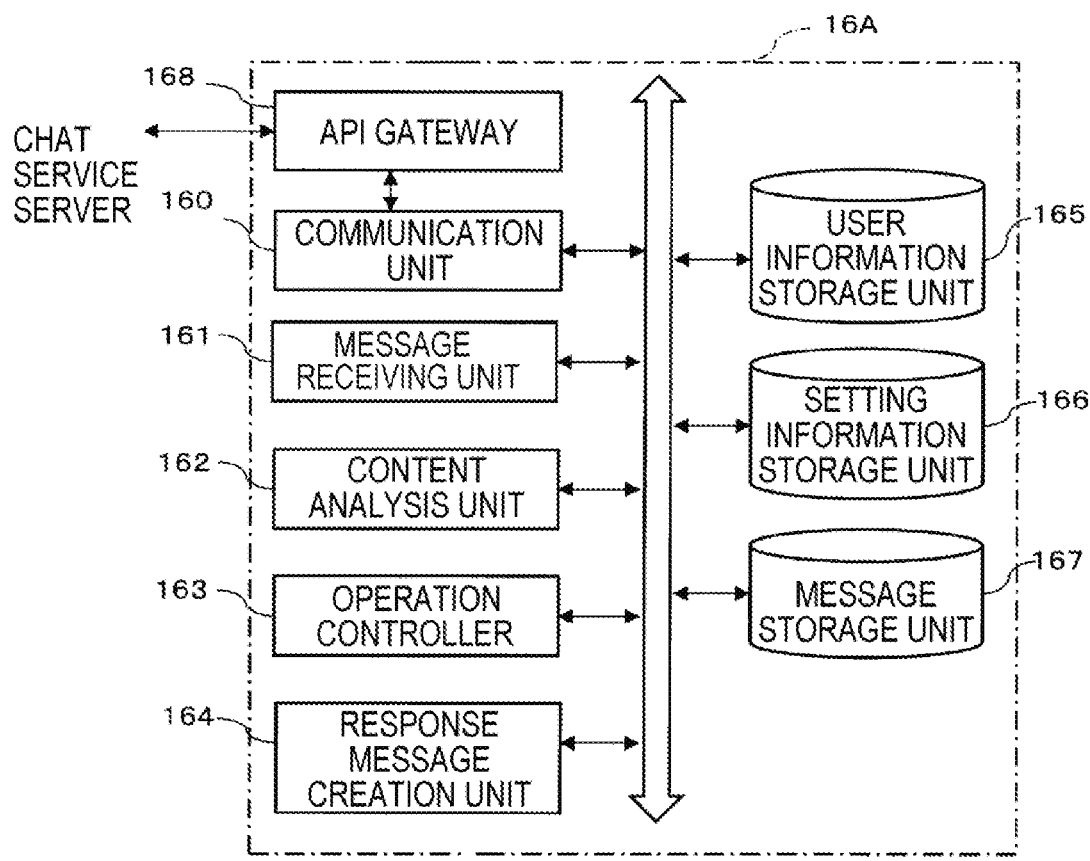
FIG. 2 is a functional block diagram according to the first exemplary embodiment.

FIG. 2 is a functional block diagram of the hot server A (16A). The hot server A includes, as functional blocks, a communication unit 160, a message receiving unit 161, a content analysis unit 162, an operation controller 163, a response message creation unit 164, a user information storage unit 165, a setting information storage unit 166, a message storage unit 167, and an API gateway 168.

The communication unit 160 communicates with the chat service server 14 and the printers A and B. The communication unit 160 exchanges messages with the chat service server 14 in communication with the chat service server 14 via the API gateway 168. The communication unit 160 outputs messages received from the chat service server 14 via the API gateway 168, that is, messages from the user terminals A to C, to the message receiving unit 161. Further, the communication unit 160 transmits a response message created by the response message creation unit 164 to the chat service server 14 via the API gateway 16/ (that is, transmits the response message to the user terminals A to C). Further, the communication unit 160 outputs a print command to the printer A and the printer B in accordance with a command from the operation controller 163, to drive the printers A and B.

The message receiving unit 161 serves as a receiver and receives messages from the communication unit 160 and outputs the messages to the content analysis unit 162. The messages include a message related to registration of the setting information. The message receiving unit 161 sequentially stores the received messages in the message storage unit 167.

The content analysis unit 162 analyzes the contents of the received messages and outputs the analysis results to the operation controller 163. Specifically, the content analysis unit 162 recognizes a user identifier (user ID) included in the received messages, extracts text portions included in the messages, and executes the syntax analysis on the extracted text portions. The syntax analysis may be performed by any method. For example, an input message is decomposed into morpheme units, and nouns, adjectives, verbs, and interrogative pronouns are extracted as keywords. When an operation instruction is included in the text portions of the messages, the content analysis unit 162 analyzes the contents of the operation instruction and outputs the analysis results to the operation controller 163. The operation instruction in the present exemplary embodiment includes a print instruction directed to the printers A and B and an instruction about the setting information of the printers A and B.

The operation controller 163 serves as a usage right granting unit, a permission information providing unit, and a controller. The operation controller 163 grants a user a usage right of a chatbot (a right to use the chatbot) according to a specific operation by the user. Information of the user to whom the usage right is granted is stored in the user information storage unit 165 (which will be described later). In addition, the operation controller 163 provides service permission information to the user to whom the usage right is granted. In addition, based on the analysis results obtained by the content analysis unit 162, the operation controller 163 registers the setting information on the operation of the printers A and B in the setting information storage unit 166. Further, the operation controller 163 outputs a print command to the printers A and B in response to a message from the user.

The response message creation unit 164 creates a response message according to the analysis results by the content analysis unit 162, and transmits the created response message to the chat service server 14 via the communication unit 160.

The user information storage unit 165 stores, as a user information table, information of a user who uses the chat service server 14, in particular, information of a user who has the usage right of the chatbot implemented by the bot server A. The chatbot is allocated with a specific account on a chat service implemented by the chat service server 14. When the user performs the specific operation with designating this account, the user enters a state in which the user can use the chatbot or has the usage right (hereinafter, referred to as a "friend registration" or "register the chatbot as a friend"), thereby determining the use of the chatbot. The user information is, for example, a user ID. The user information storage unit 165 may store information on a right that each user has.

The setting information storage unit 166 stores, as a table, the setting information for each user having the usage right of the chatbot implemented by the bot server A. Items of the setting information may include, but are not limited to, for example, identification information of a printer to be used, a color mode, a paper size, the number of copies, and the like. As will be described later, the setting information may be determined according to the contents of a service provided by the bot server A. In the case of a print service, the setting information is information on printing. In the case of a search service, the setting information is information on search conditions. The setting information is information that defines the contents of a service and may include plural items.

The message storage unit 167 stores the messages transmitted from the users and received by the message receiving unit 161, as a history.

Figure 3:
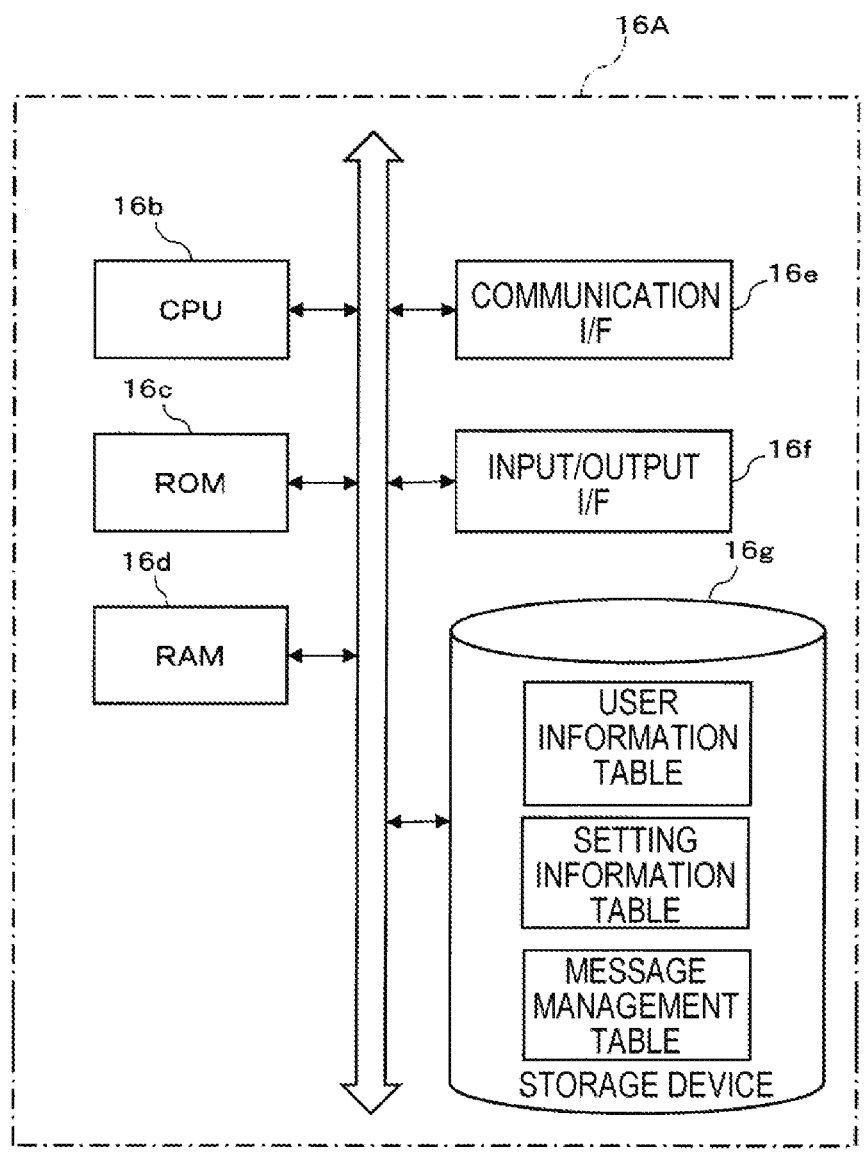
FIG. 3 is a configuration block diagram according to the first exemplary embodiment.

FIG. 3 is a configuration block diagram of the bot server A. The bot server A is implemented by one or more server computers. The hot server A includes one or more CPUs 16b, a ROM 16c, a RAM 16d, a communication interface (I/F) 16e, an input/output FT 16f, and a storage device 16g.

The one or more CPUs 16b implement the functions of the chatbot by reading out a bot application stored in the ROM 16c or the storage device 16g and using the RAM 16d as a working memory. That is, the one or more CPUs 16b automatically respond to a message from the user, and when an operation instruction is included in the message from the user, the one or more CPUs 16b drive the printer A or B according to the operation instruction. By executing the bot application, the CPUs 16b implement the message receiving unit 161, the content analysis unit 162, the operation controller 163, the response message creation unit 164, and the API gateway 168 in FIG. 2.

The communication I/F 16e exchanges messages with the chat service server 14 and outputs a print command to the printers A and B.

The input/output OF 16f exchanges data with an input device such as a keyboard or a mouse, and an output device such as a display device.

The storage device 16g is implemented by a nonvolatile memory such as a hard disk drive (HDD) or a solid state drive (SSD). The storage device 16g stores a user information table, a setting information table, and a message management table as well as the bot application. The storage device 16g implements the user information storage unit 165, the setting information storage unit 166, and the message storage unit 167 in FIG. 2.

In this exemplary embodiment, the software robot program configured to implement the chatbot is executed by a CPU. A portion of the chatbot may be implemented by hardware processing instead of processing by execution of the program. The hardware processing may be performed using a circuit such as an ASIC or a field programmable gate array (FPGA).

Next, registration of the setting information will be described taking the user A and the user B as an example.

FIG. 4 schematically illustrates a setting registering process by the user A and the user B. When the user A and the user B register a chatbot allocated with a specific account on a chat service as a friend, the bot server A (16A) allocates a user identifier (user ID) to each of the user A and the user B, and also allocates a printer identifier (printer ID) that uniquely identifies each of the printer A and the printer B to each of the printer A and the printer B. As for the user ID, the accounts on the chat service of the users A and B may be used as they are.

Next, the user A transmits a message to the bot server A (16A) via the chat service server 14, specifies the printer A or the printer B, and registers the setting information. For example, the user A specifies the printer A and then transmits a message designating the followings as the setting information.
    color mode: color
    paper size: A4
    number of copies: one copy
Upon receiving this message, the bot server A analyzes the contents of the message. When interpreting the contents of the message are as the setting information, the hot server A associates the user A and the printer A, and records the setting information in the setting information table.

Similarly, the user B transmits a message to the hot server A (16A) via the chat service server 14, specifies the printer A or the printer B, and registers the setting information. For example, the user B specifies the printer B and then transmits a message designating the followings as the setting information.
    color mode: monochrome
    paper size: Letter
    number of copies: two copies
Upon receiving this message, the hot server A analyzes the contents of the message. When interpreting the contents of the message as the setting information, the hot server A associates the user B and the printer B, and records the setting information in the setting information table.

FIG. 5 illustrates an example of the setting information table stored in the setting information storage unit 166. For each user, a printer, a color (color mode), a size (paper size), the number of copies are recorded in association with each other. More specifically, printer identification information, a color (color mode), a size (paper size), the number of copies are recorded in association with each other for each user identification information.

In this manner, the user A or the user B registers a printer and the setting information by registering the chatbot as a friend. The user A or the user B transmits a message such as "print" to the chatbot so as to execute a print service with the desired printer and the desired printing conditions.

In the meantime, when the user A and the user B form the same group and are performing a group chat, the user A may want to cause the chatbot which the user A has registered as a friend to join the group chat. It is assumed that the user B has not yet registered the chatbot as a friend. In this case, the user A Who has registered the chatbot as a friend and the user B Who has not yet registered the chatbot as a friend exist in the same group chat. At this time, it would be inconvenient if the chatbot makes an unlimited automatic response to a message of the user B who has not registered the chatbot as a friend to provide a prim service (from the viewpoint of the user A, the user B prints desirably using the chatbot even though the user A has registered the chatbot as a friend).

In particular, at the point of time when the chatbot joins a group chat, it is unknown which user in the group chat has registered the chatbot as a friend and which user in the group chat has not registered the chatbot as a friend (at least the user who invites the chatbot to the group chat may be recognized as a user who has registered the chatbot as a friend, but it is unknown if the other users have registered the chatbot as a friend). Therefore, if a print service were to be executed indiscriminately according to requests from the users, the print service would be executed according to requests from the users who have not registered the chatbot as a friend.

Then, in the present exemplary embodiment, the chatbot provides information on the usage right to a user who has registered the chatbot as a friend. The chatbot also provides service permission information which is transferable between users to the user who has registered the chatbot as a friend, independently of the usage right. The chatbot controls a print service to be executed when the service permission information associated with a service request message from the user exists. The chatbot controls the print service not to be executed when the service permission information associated with the service request message from the user does not exist. Thus, the chatbot only needs to switch between execution and non-execution of the print service according to the presence or absence of the service permission information. The chatbot does not necessarily identify whether the user who has transmitted the service request message is the user who has registered the chatbot as a friend. Basically, the usage right is a right attached to a user who has performed a specific operation. On the other hand, while the service permission information is provided to a user having the usage right, the service permission information is an independent right from the user rather than a right attached to the user and is transferable between users. The term "independent" means not being exclusive to a certain user.

When it is identified that the user who has transmitted the service request message is a user having the usage right, the chatbot may obviously execute a service according to a service request message from the user. The execution or non-execution of the service according to the presence or absence of the usage right and the presence or absence of the service permission information is summarized as follows.

(1) For a user who has the usage right
    Even when there is no service permission information, the service is executed.
    When there is the service permission information, the service is executed.
(2) For a user who does not have the usage right
    When there is no service permission information, the service is not executed.
    When there is the service permission information, the service is executed.

As described above, it should be noted that for the user who does not have the usage right, the service is not unlimitedly executed but is executed only when there is the service permission information which is different from the usage right.

Figure 6A:
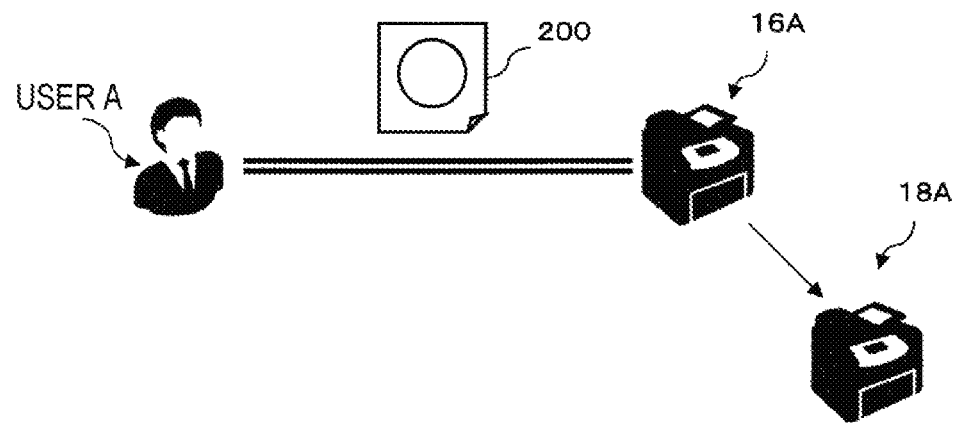
FIG. 6A is a view for explaining execution of a service according to a request from a user who has the usage right.

FIG. 6A illustrates an example in which the user A who has registered the chatbot 16A is chatting with the chatbot 16A on a one-to-one basis rather than a group chat. In this case, when a document 200 as image data is transmitted from the user A having the usage right, the chatbot 16A drives the printer 18A in response to this request to provide a print service.

Figure 6B:
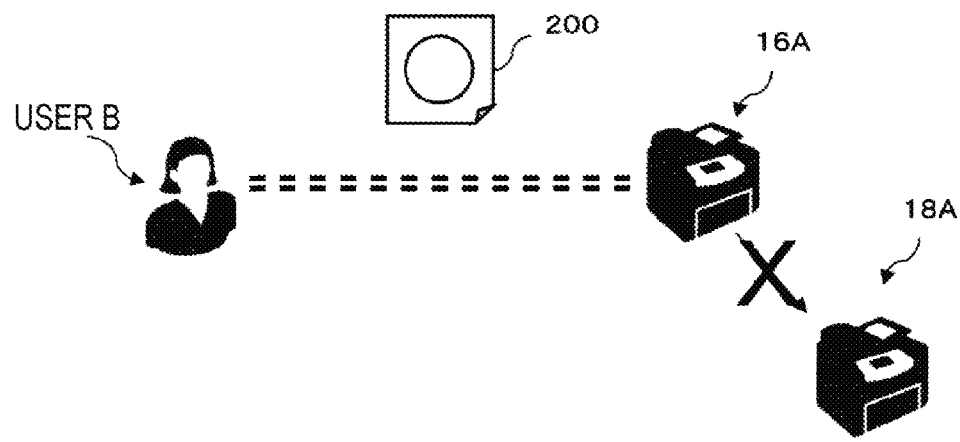
FIG. 6B is a view for explaining non-execution of the service according to a request from a user who does not have the usage right.

FIG. 6B illustrates an example in which where the user B who has not registered the chatbot 16A as a friend and the chatbot 164 exist. In this case, since the user B has not registered the chatbot 16A as a friend, the user B does not have the usage right. Therefore, even when the document 200 is transmitted from the user B, the chatbot 16A does not drive the printer 18A in response to a request from the user B who does not have the usage right and does not provide the print service.

Figure 6C:
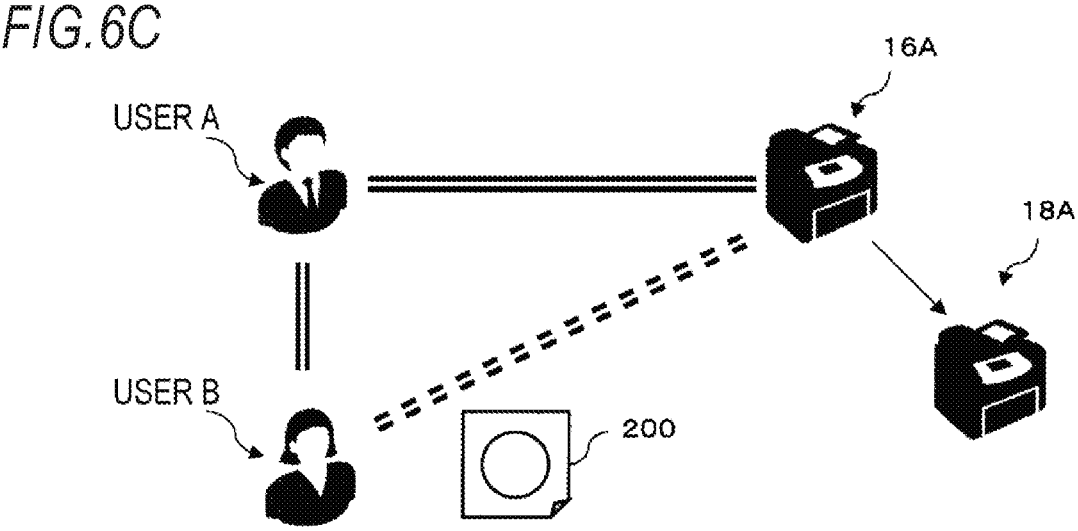
FIG. 6C is a view for explaining execution of the service according to a request from a user who does not have the usage right in a group chat.

FIG. 6C illustrates an example in which the chatbot 164 joins a group chat of the user A who has registered the chatbot 16A as a friend and the user B who has not registered the chatbot 16A as a friend, in response to an invitation from the user A. The user A and the user B have registered one another as a friend and form the group chat. It is unknown to the chatbot 16A whether the user B has registered the chatbot 16A as a friend. Therefore, when the document 200 is transmitted from the user B, it is not preferable that the chatbot 16A provides the print service in unlimited response to this request in the same way as the chatbot 16A provides the print service to the user A.

Figure 7A:
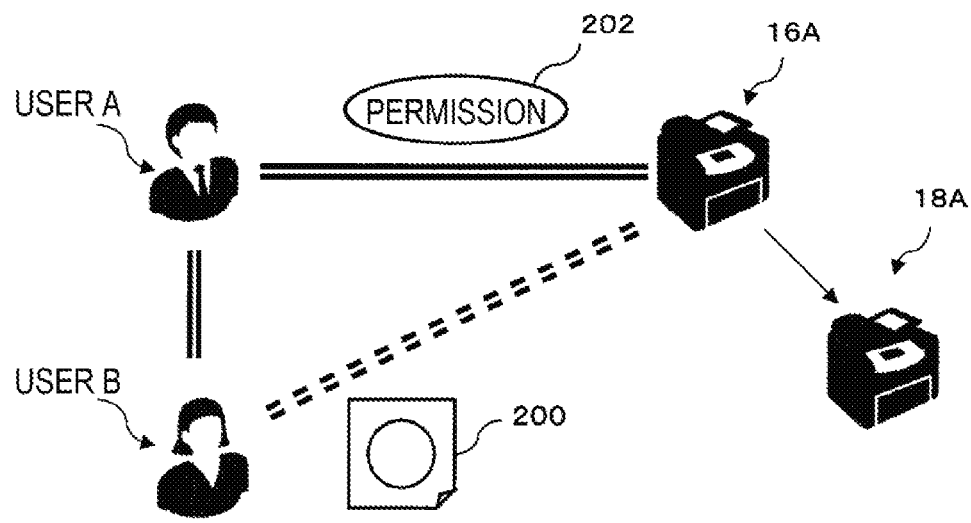
FIG. 7A is a view (part 1) for explaining a process according to the first exemplary embodiment.

FIG. 7A illustrates a process of the present exemplary embodiment. To the user A who has registered the chatbot 164 as a friend, service permission information is provided from the chatbot 16A upon completion of the friend registration. This service permission information is information independent and different from the usage right of the chatbot 16A and is transferable between users not via the chatbot 16A. In this sense, the service permission information may be regarded as enabling information or token of a service request message. The form of the service permission information is selected freely. The form may be a transmittable and receivable electronic sticker (permission sticker). Upon completion of the friend registration, the chatbot transmits and provides the permission sticker to the user who makes the friend registration.

When the user A transmits the document 200 to the chatbot 16A, the user A transmits a permission sticker 202 in association with the document 200. Upon receiving the permission sticker 202 associated with the document 200, the chatbot 164 executes the print service according to the transmitted document 200.

Since the user B has not registered the chatbot 16A as a friend, the user B does not have the permission sticker 202. Therefore, when transmitting the document 200 to the chatbot 16A, the user B does not transmit the permission sticker 202. The chatbot 16A does not execute the print service according to the transmitted document 200 because the permission sticker 202 does not exist.

On the other hand, when the permission sticker 202 is transmitted from the user A who has registered the chatbot 16A as a friend in association with the document 200 transmitted from the user B, upon receiving the permission sticker 202, the chatbot 16A assumes that the permission sticker 202 associated with the document 200 transmitted from the user B exists, and executes the print service according to the document 200. Control is switched between the execution of the print service and the non-execution of the print service according to whether the permission sticker 202 is present or absent, regardless of whether the user B has registered the chatbot as a friend.

Since the user B has not registered the chatbot as a friend, the setting information table as illustrated in FIG. 5 is not provided. Therefore, when only a single printer exists, the chatbot executes the print service with the single printer. When there are plural printers, the chatbot executes the print service using one of the printers as a default printer. When providing the permission sticker 202, the chatbot may store a user ID of a providing destination together with an ID of the permission sticker 202. Then, the chatbot may specify a user of the providing destination based on the ID of the permission sticker 202, and execute the print service with a printer designated by the setting information for the specified user. For example, for the permission sticker 202, the ID of permission sticker=001, the providing destination of the permission sticker=user A, and the like are stored. When the permission sticker 202 is transmitted from the user A who has made a friend registration, the providing destination of the permission sticker 202 is the user A. The user A is specified based on the ID of the permission sticker 202. The print service is executed with the printer A using the setting information on the user A. At this time, by transmitting the permission sticker 202, the user A may give a print permission to the user B and also allow the user B to use the setting information of the user A.

In the example of FIG. 7A, the user B transmits the document 200 and the user A transmits the permission sticker 202. Since the permission sticker 202 is electronic information and may be transmitted and received, the user A may provide (transfer) the permission sticker 202 to the user B, and the user B may transmit the permission sticker 202 in association with the document 200.

Figure 7B:
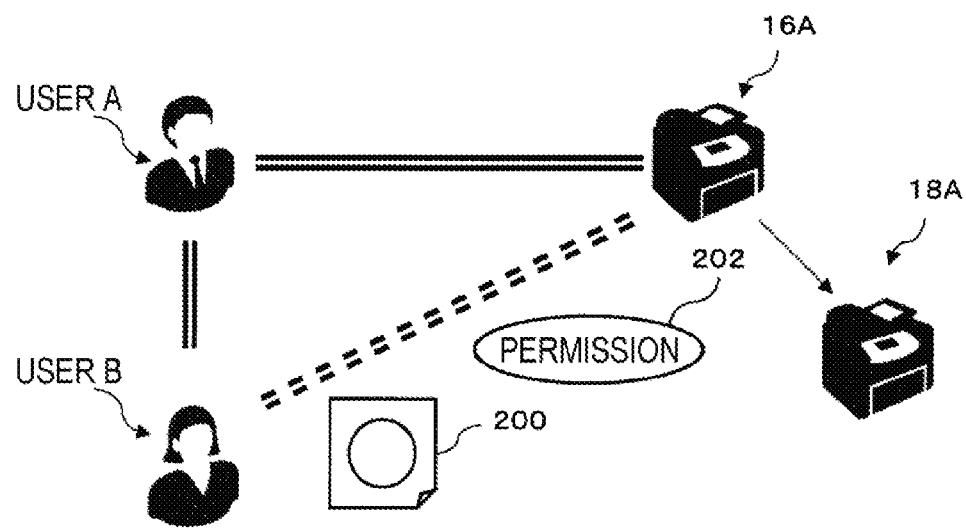
FIG. 7B is a view (part 2) for explaining a process according to the first exemplary embodiment.

FIG. 7B illustrates a process in this case. When transmitting the document 200 to the chatbot 16A, the user B transmits the permission sticker 202 provided from the user A in association with the document 200. Upon receiving the permission sticker 202 associated with the document 200, the chatbot 16A executes the print service according to the document 200.

Hereinafter, the process of the present exemplary embodiment will be described in more detail.

Figure 8:
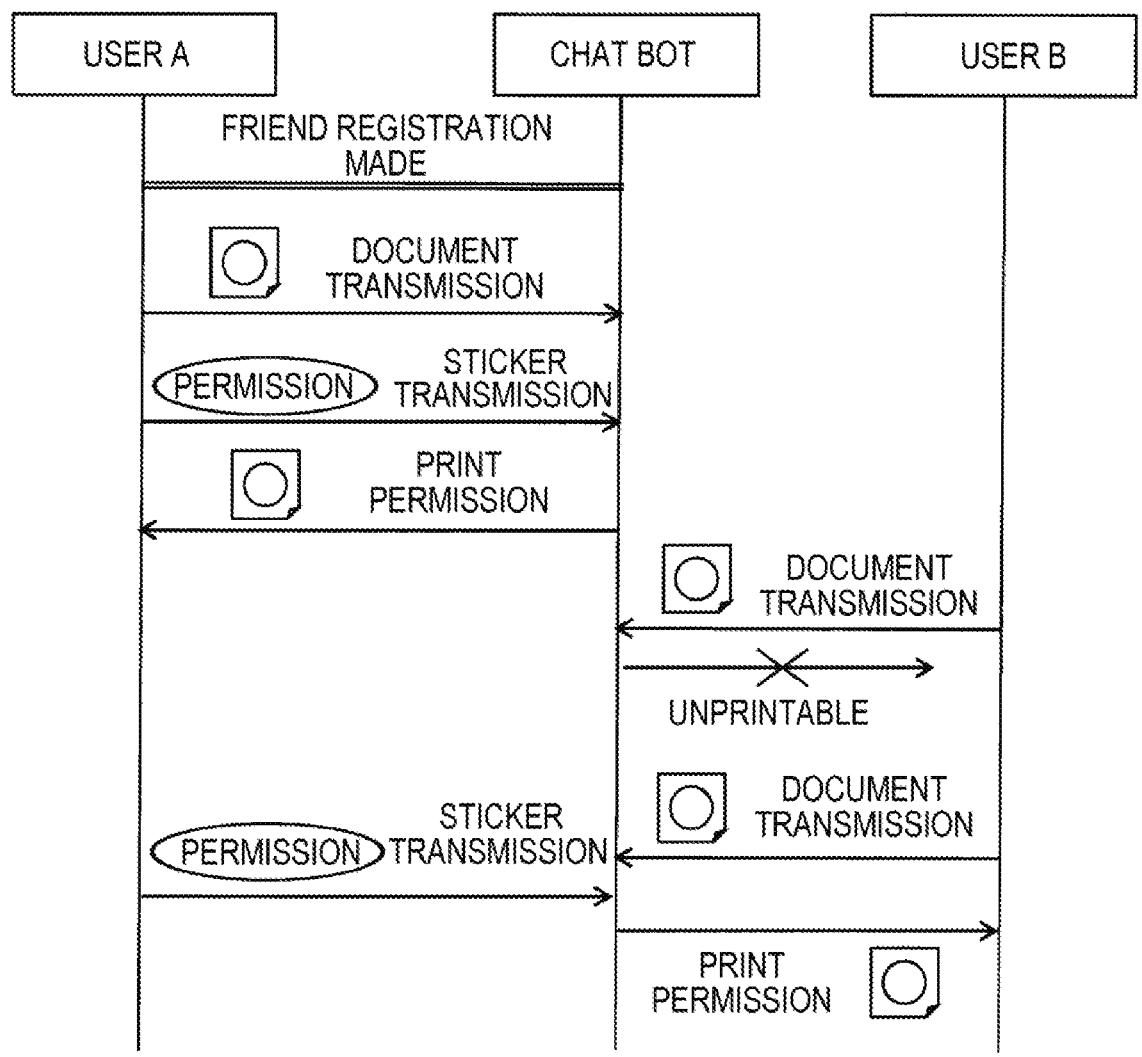
FIG. 8 is a sequence diagram according to the first exemplary embodiment.

FIG. 8 is a sequence diagram of the present exemplary embodiment. This is a process performed among the user terminal A operated by the user A, the user terminal B operated by the user B, and the chatbot. It is assumed that the user A, the user B, and the chatbot participate in the same group chat, the user A has registered the chatbot as a friend, and the user B has not registered the chatbot as a friend.

The user A operates the user terminal A to register the chatbot as a friend. The chatbot stores the user ID of the user who has registered the chatbot as a friend in the user information table of the user information storage unit 165. In addition, the chatbot transmits the service permission information, for example, a permission sticker, to the user terminal A of the user A who has registered the chatbot as a friend.

Next, the user A transmits a document as image data in the group chat. Further, in association with the transmission of the document, the user A transmits the permission sticker acquired from the chatbot when the user A registers the chatbot as a friend.

Upon receiving the document as a service request message and receiving the permission sticker associated with the document, the chatbot permits printing and executes the print service.

Next, the user B who has not registered the chatbot as a friend transmits a document as image data in the group chat. At this time, the user B does not transmit the permission sticker in association with the transmission of this document.

The chatbot receives the document as the service request message. However, since there is no permission sticker associated with the document, the chatbot does not permit printing and does not execute the print service. At this time, in addition to ignoring the request from the user B, the chatbot may create and respond with a message saying "Unprintable". Furthermore, the chatbot create and respond with a message saying, for example, "Make a friend registration" to thereby prompt the user B to register the chatbot as a friend.

In the meantime, the user B who has not registered the chatbot as a friend transmits a document as image data in the group chat and then the user A transmits a permission sticker. In this case, the chatbot receives the document as a service request message, and the permission sticker associated with this document exists. Therefore, the chatbot permits the print and executes print service.

Second Exemplary Embodiment

In the first exemplary embodiment, a user first transmits a document and then transmits a permission sticker in association with the document. Alternatively, the user may first transmit the permission sticker and then transmit the document.

Figure 9:
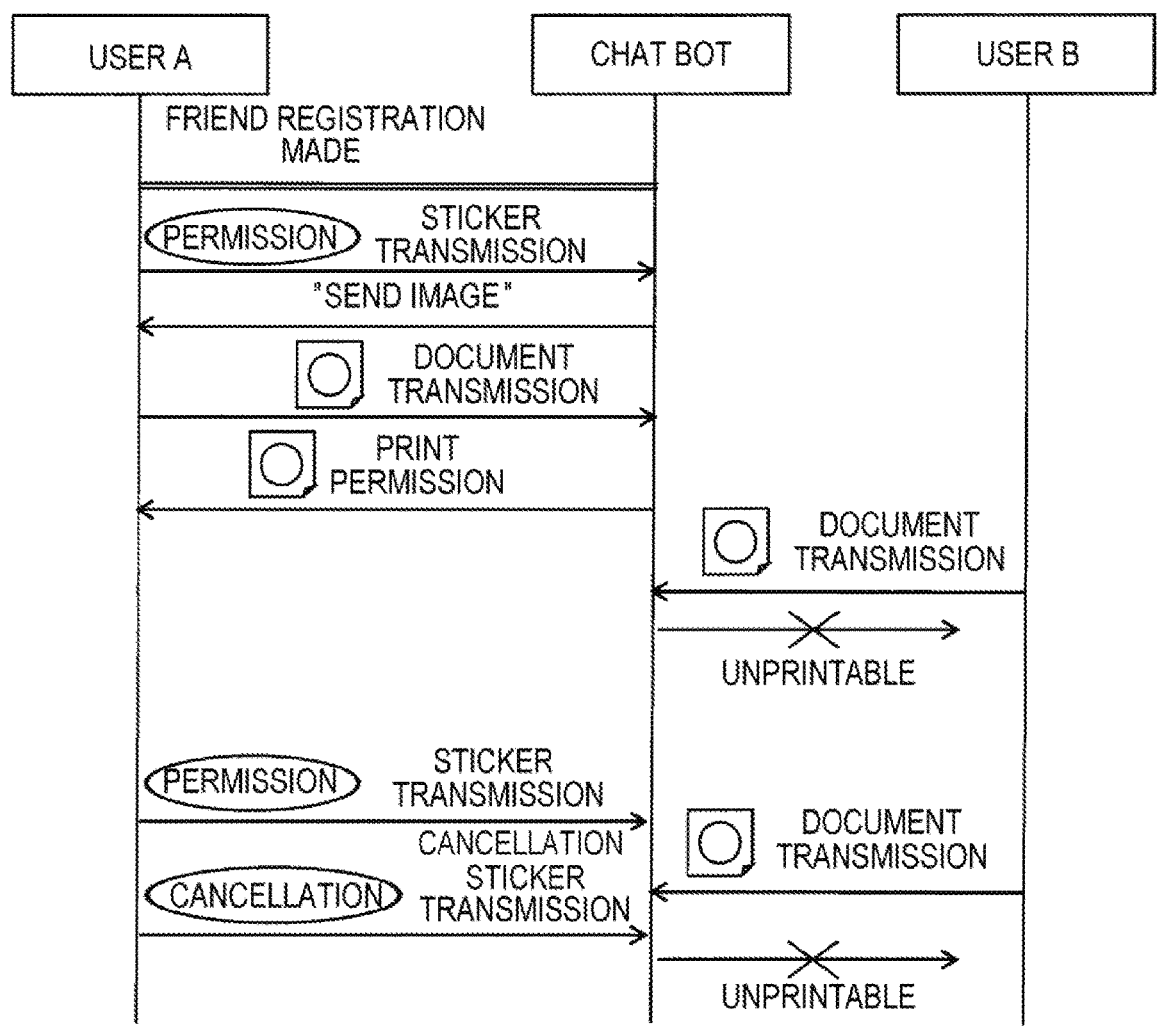
FIG. 9 is a sequence diagram according to a second exemplary embodiment.

FIG. 9 is a sequence diagram of the present exemplary embodiment. It is assumed that the user A, the user B, and the chatbot participate in the same group chat, the user A has registered the chatbot as a friend, and the user B has not registered the chatbot as a friend.

The user A operates the user terminal A to register the chatbot as a friend. The chatbot stores the user ID of the user who has registered the chatbot as a friend in the user information table of the user information storage unit 165, in addition, the chatbot transmits information on the usage right, specifically, a permission sticker, to the user terminal A of the user A who has registered the chatbot as a friend.

Next, the user A transmits the permission sticker in the group chat. Upon receiving the permission sticker, the chatbot creates and responds with a message saying "Send me an image".

The user A who views this message transmits a document as image data. When receiving the document following the permission sticker, the chatbot determines that there is a permission sticker associated with this document, permits the printing of the document, and executes the print service.

In the meantime, when the user B transmits a document without transmitting a permission sticker in advance, the chatbot receives this document, but determines that there is no permission sticker associated with this document, does not permit the printing of the document, and executes no print service.

When the user A transmits the permission sticker in the group chat and then the user B transmits the document, the chatbot determines that the permission sticker associated with the document exists, permits the printing of the document transmitted from the user B, and executes the print service. When the user A transmits a cancellation sticker to cancel the permission sticker after the user B transmits the document, the chatbot invalidates the previous permission sticker upon reception of this cancellation sticker and also invalidates the printing of the document associated with this permission sticker. Therefore, the chatbot does not execute the print service of the document transmitted from the user B.

The cancellation sticker in the present exemplary embodiment may be provided to the user A from the chatbot as a set with the permission sticker when the friend registration is completed.

The cancellation sticker is one to invalidate the previous permission sticker. It can be said that the cancellation sticker invalidates the execution of the print service of the document transmitted between the permission sticker and the cancellation sticker. Alternatively, it can be said that the cancellation sticker invalidates the execution of the print service of the document transmitted immediately before.

Third Exemplary Embodiment

In the second exemplary embodiment, one document is printed with one permission sticker. However, plural documents may be printed Ti one permission sticker.

Figure 10:
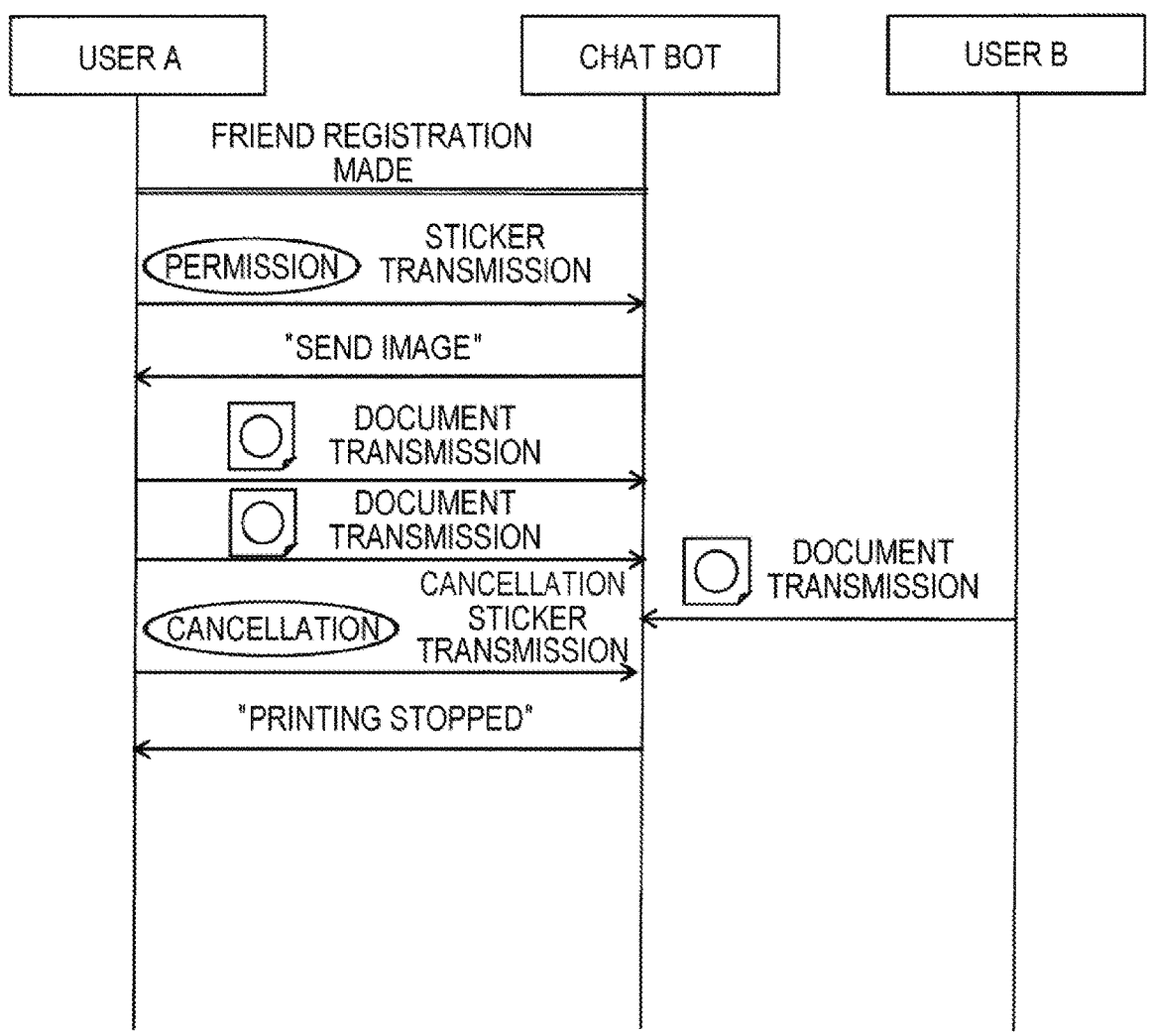
FIG. 10 is a sequence diagram according to a third exemplary embodiment.

FIG. 10 is a sequence diagram of the present exemplary embodiment. It is assumed that the user A, the user B, and the chatbot participate in the same group chat, the user A has registered the chatbot as a friend, and the user B has not registered the chatbot as a friend.

The user A operates the user terminal A to register the chatbot as a friend. The chatbot stores the user ID of the user who has registered the chatbot as a friend in the user information table of the user information storage unit 165, in addition, the chatbot transmits the service permission information and cancellation information, specifically, the permission sticker and the cancellation sticker, to the user terminal A of the user A who has registered the chatbot as a friend.

Next, the user A transmits the permission sticker in the group chat. Upon receiving the permission sticker, the chatbot creates and responds with a message saying "Send me an image".

The user A who views this message sequentially transmits plural documents as image data. FIG. 10 illustrates an example where two documents are transmitted. When receiving the plural documents following the permission sticker, the chatbot determines that there is the permission sticker associated with these documents, permits the printing of the documents, and executes the print service.

After the user A transmits the plural documents, when the user B transmits a document during the user A's transmission, the chatbot executes the print service without distinguishing the documents from the user A and the document from the user B.

In order to prevent this, the user A transmits the cancellation sticker after the user B transmits the document. When receiving the cancellation sticker, the chatbot invalidates the execution of the print service of the document transmitted immediately before the reception, and executes the print service of the document transmitted from the user A but does not execute the print service of the document transmitted from the user B.

Fourth Exemplary Embodiment

In the second and third exemplary embodiments, the print service is executed by transmitting one or more documents after transmitting the permission sticker. A certain time limit may be placed on the effectiveness of the permission sticker. In this case, while the print service is executed for a document transmitted within a certain period of time from the transmission of the permission sticker, the permission sticker expires after the certain period of time elapses and the print service is not executed for a document transmitted thereafter.

Figure 11:
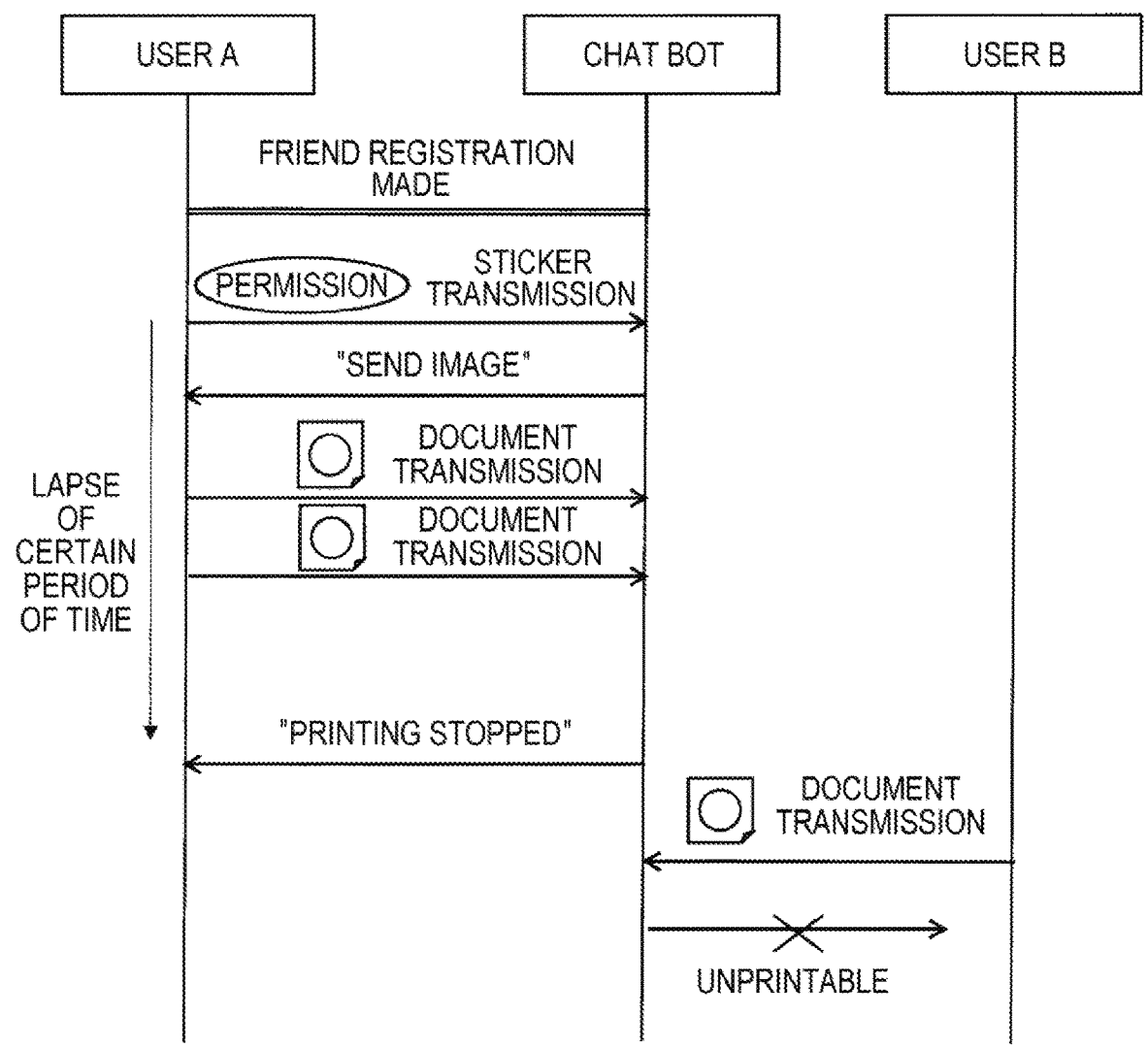
FIG. 11 is a sequence diagram according to a fourth exemplary embodiment.

FIG. 11 is a sequence diagram of the present exemplary embodiment. It is assumed that the user A, the user B, and the chatbot participate in the same group chat, the user A has registered the chatbot as a friend, and the user B has not registered the chatbot as a friend.

The user A operates the user terminal A to register the chatbot as a friend. The chatbot stores the user ID of the user who has registered the chatbot as a friend in the user information table of the user information storage unit 165. In addition, the chatbot transmits information on the usage right, specifically, the permission sticker and the cancellation sticker, to the user terminal A of the user A who has registered the chatbot a friend.

Next, the user A transmits the permission sticker in the group chat. Upon receiving the permission sticker, the chatbot creates and responds with a message saying "Send me an image".

The user A who views this message sequentially transmits plural documents as image data. FIG. 11 illustrates an example in which two documents are transmitted. When receiving the plural documents following the permission sticker, the chatbot determines that there is the permission sticker associated with these documents, permits the printing of the documents, and executes the print service.

In the meantime, when the certain period of time elapses since the permission sticker is transmitted, that is, since the chatbot receives the permission sticker, the chatbot invalidates the received permission sticker and creates and transmits a message saying "Printing stopped".

The user A and the user B who view this message may recognize that the permission sticker has been invalidated. For example, even when the user B transmits a document after receiving the message saying "Printing stopped" from the chatbot, the chatbot does not execute the print service of the document because the permission sticker has already expired.

Fifth Exemplary Embodiment

Figure 12:
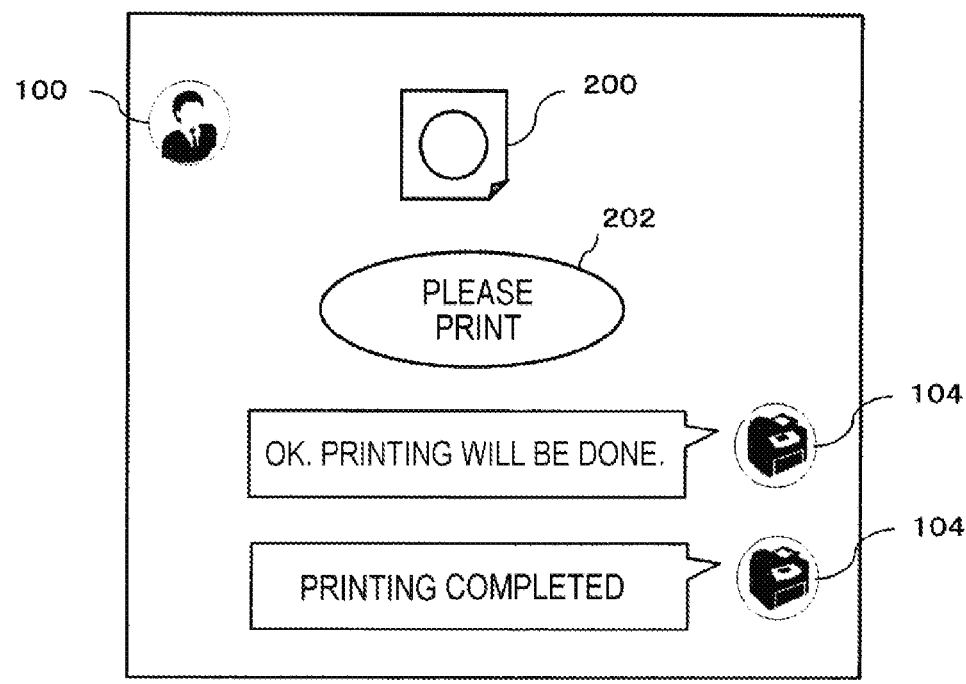
FIG. 12 is a view for explaining a terminal screen according to a fifth exemplary embodiment.

FIG. 12 illustrates an example of a terminal screen displayed on a display unit of the user terminal A operated by the user A who has registered the chatbot as a friend.

On the screen of the user terminal A, a visual representation figure (icon) 100 representing the user A and an icon 104 representing the chatbot are displayed. Transmitted messages or documents are sequentially displayed on the screen of the user terminal A from the top to the bottom in a chronological order.

The user A operates the user terminal A to transmit the document 200, and then transmits the permission sticker 202. The permission sticker 202 is accompanied by a phrase "Please print". This phrase may be any phrase. In addition, the shape and color of the permission sticker 202 may be freely selected.

The chatbot receives the document 200 and the permission sticker 202 transmitted from the user A and executes the print service of the document 200 since the permission sticker 202 associated with the document 200 is present. That is, the chatbot creates and responds with a message saying "OK. Printing will be done" and executes the print service. When the printing of the document 200 is completed, the chatbot creates and transmits a message saying "Printing completed" in accordance with a completion notification from the printer.

After receiving the document 200, the chatbot may create and respond with a message saying, for example, "Send a permission sticker" and may prompt the user A to transmit the permission sticker. The user A is a user who has already registered the chatbot as a friend. However, the chatbot switches between the execution of the print service and the non-execution of the print service according to presence or absence of the permission sticker 202.

Sixth Exemplary Embodiment

Figure 13:
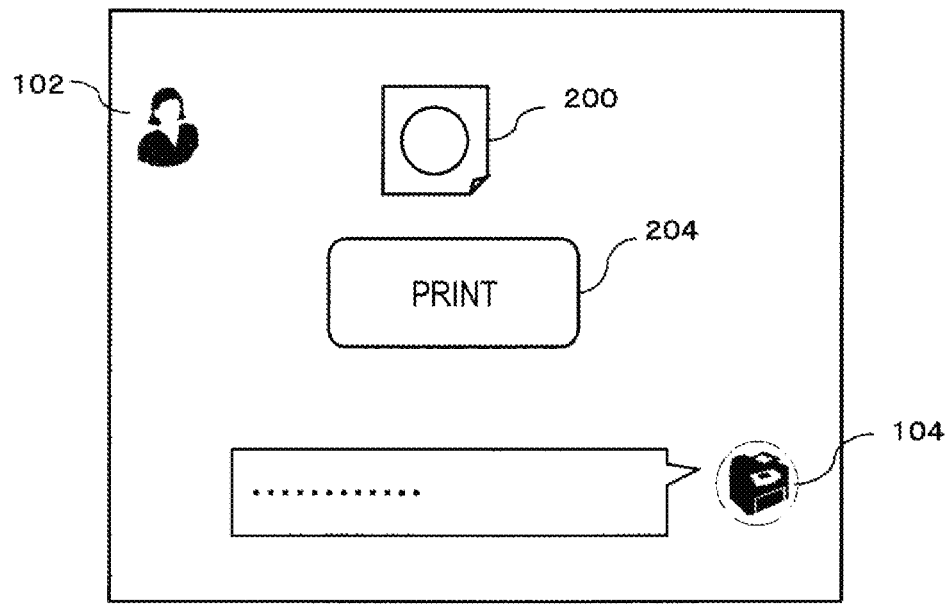
FIG. 13 is a view for explaining a terminal screen according to a sixth exemplary embodiment.

FIG. 13 illustrates an example of a terminal screen displayed on a display unit of the user terminal B operated by the user B who has not registered the chatbot as a friend.

The user B operates the user terminal B to transmit the document 200 and then transmits a permission sticker 204 that is different from the permission sticker 202 provided to a user who registers the chatbot as a friend.

The chatbot receives and analyzes the permission sticker 204, determines that the permission sticker 204 is different from the original permission sticker 202, and does not execute the print service of the document 200. FIG. 13 illustrates that since the print service is not executed, the chatbot does not transmit a message indicating that printing will be done.

Since the permission sticker 204 is different, the chatbot may create and respond with a message saying "Unprintable because the permission sticker is different".

Seventh Exemplary Embodiment

Figure 14:
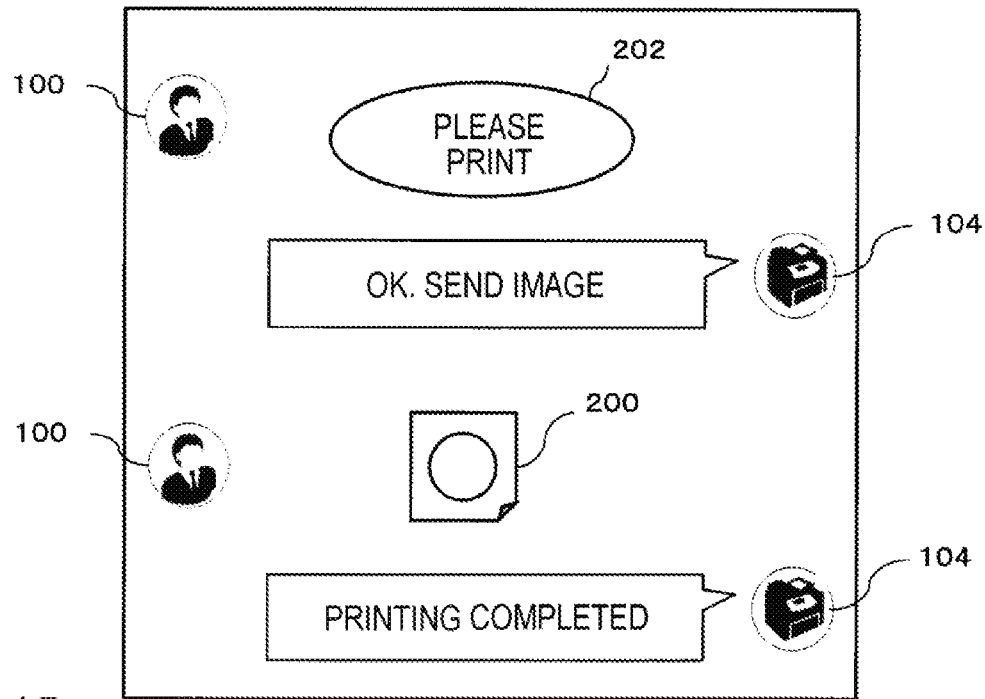
FIG. 14 is a view for explaining a terminal screen according to a seventh exemplary embodiment.

FIG. 14 illustrates an example of another terminal screen displayed on the display unit of the user terminal A operated by the user A who has registered the chatbot as a friend.

The user A operates the user terminal A to transmit the permission sticker 202.

When receiving the permission sticker 202, the chatbot creates and responds with a message saying "OK! Send an image".

The user A who views this message transmits the document 200 in accordance with this message. When receiving this document 200, the chatbot executes the print service of the document 200 since the permission sticker 202 associated with the document 200 exists. When the printing is completed, the chatbot creates and transmits a message saying "Printing completed" in accordance with a completion notification from the printer.

In the example of FIG. 12, the permission sticker 202 is transmitted after the document 200 is transmitted. It should be noted that in the example of FIG. 14, the permission sticker 202 is transmitted before the document 200 is transmitted.

Eighth Exemplary Embodiment

Figure 15:
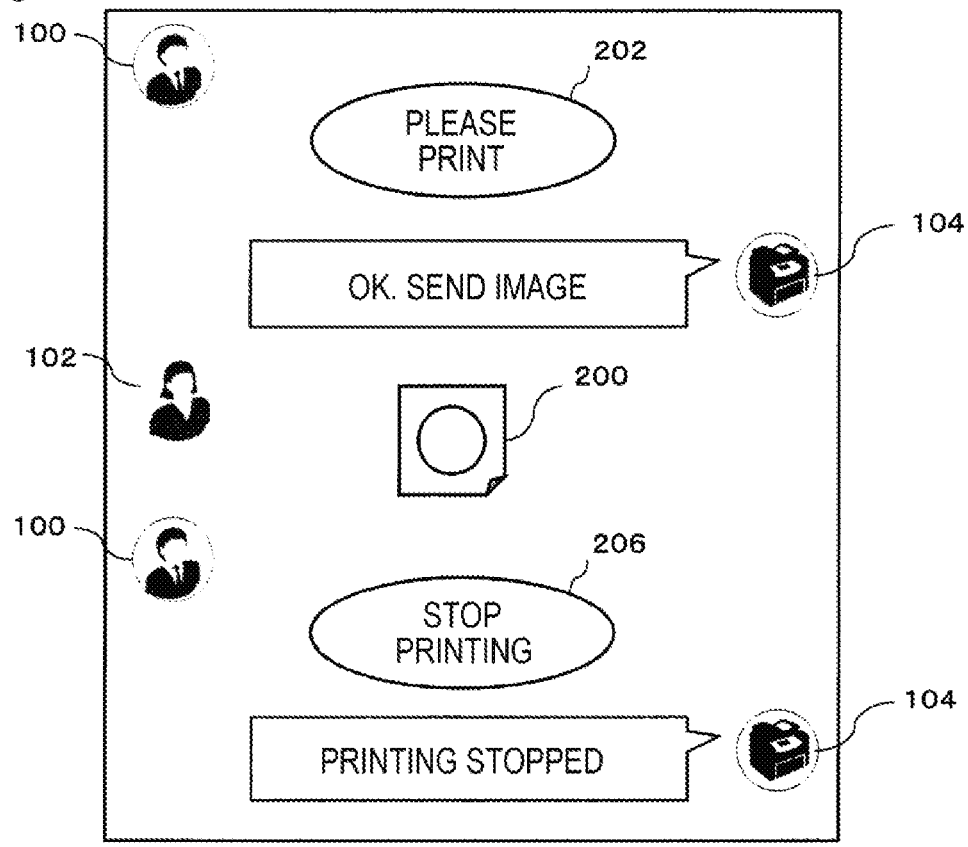
FIG. 15 is a view for explaining a terminal screen according to an eighth exemplary embodiment.

FIG. 15 illustrates an example of still another terminal screen displayed on the display unit of the user terminal A operated by the user A who has registered the chatbot as a friend. Since the user A, the user B, and the chatbot constitute the same group chat, the icon 100 of the user A, an icon 102 of the user B, and the icon 104 of the chatbot are displayed.

The user A operates the user terminal A to transmit the permission sticker 202.

When receiving the permission sticker 202, the chatbot creates and responds with a message saying "OK! Send an image".

The user B who views this message transmits the document 200 after receiving this message. When receiving this document 200, the chatbot attempts to execute the print service of the document 200 since the permission sticker 202 associated with the document 200 is present. However, prior to the print execution, the user A transmits a cancellation sticker 206. The cancellation sticker 206 is accompanied by a phrase "Printing stopped". This phrase may be any phrase. In addition, the shape and color of the cancellation sticker 206 may be freely selected. The shape and color of the cancellation sticker 206 may have a certain relationship with the shape and color of the permission sticker 204. Also, the cancellation sticker 206 may have a shape and a color indicating that the permission sticker 204 and the cancellation sticker 206 have opposite meanings to each other. When receiving the cancellation sticker 206 before the start of the print execution, the chatbot invalidates the print service of the document 200 immediately before that and does not execute the print service. The chatbot creates and transmits a message saying "Printing stopped".

When the cancellation sticker 206 is transmitted after the chatbot receives the document 200 and creates and responds with a message saying "Printing will be done", the chatbot may execute the print service as it is, or may stop the print service if it is possible to interrupt the print process in the printer.

Ninth Exemplary Embodiment

Figure 16:
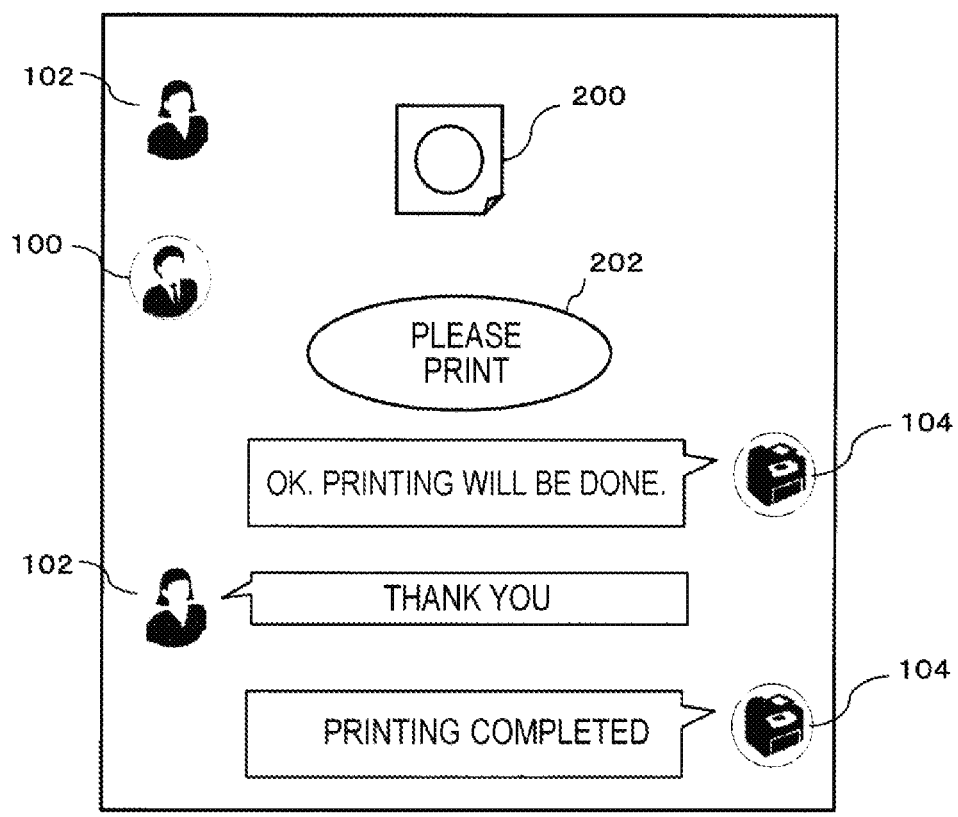
FIG. 16 is a view for explaining a terminal screen according to a ninth exemplary embodiment.

FIG. 16 illustrates an example of still another terminal screen displayed on the display unit of the user terminal B operated by the user B who has not registered the chat bot as a friend.

The user B operates the user terminal B to transmit the document 200. Thereafter, the user A who views this message operates the user terminal A to transmit the permission sticker 202.

Upon the chatbot receiving the permission sticker 202, the permission sticker 202 associated with the document 200 is present. Therefore, the chatbot creates and responds with a message saying "OK. Printing will be done" and executes the print service.

In response to the permission sticker 202 being transmitted from the user A, the user B transmits a message saving "Thank you". When the printing of the document 200 is completed, the chatbot creates and transmits a message saving "Printing completed".

Tenth Exemplary Embodiment

Figure 17:
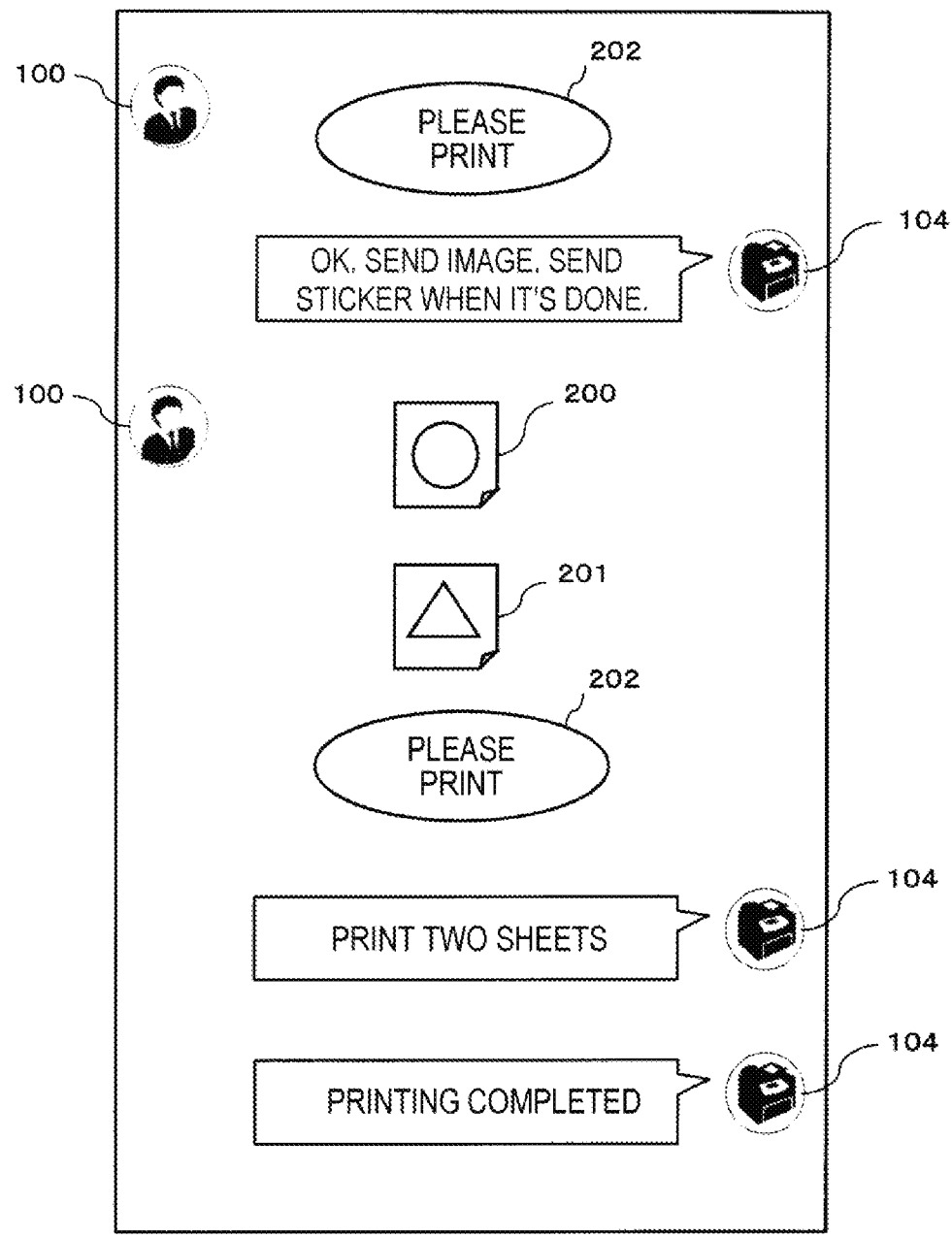
FIG. 17 is a view for explaining a terminal screen according to a tenth exemplary embodiment.

FIG. 17 illustrates an example of still another terminal screen displayed on the display unit of the user terminal A operated by the user A who has registered the chatbot as a friend.

The user A operates the user terminal A to transmit the permission sticker 202. When receiving the permission sticker 202, the chatbot creates and responds with a message saying "OK! Send an image, and send a sticker when it's done".

The user A who views this message sequentially transmits plural documents 200 and 201. Then, after transmitting the plural documents 200 and 201, the user A transmits the permission sticker 202 again.

Since the permission sticker 202 exists before and after the documents 200 and 201, the chatbot executes the print service for the documents 200 and 201 transmitted between the two permission stickers 202. Then, since the number of documents transmitted between the two permission stickers 202 is two, the chatbot creates and responds with a message saying "Print two sheets". After completion of the printing, the chatbot creates and transmits a message saying "Printing completed".

In the present exemplary embodiment, the print service is executed for the documents 200 and 201 between the two permission stickers 202. Alternatively, the print service may be executed only for a document which exists within a first predetermined period of time after the transmission of the first permission sticker 202 and exists within a second predetermined period of time before the transmission of the second permission sticker 202 (which is the same as or different from the first predetermined period of time).

Eleventh Exemplary Embodiment

Figure 18:
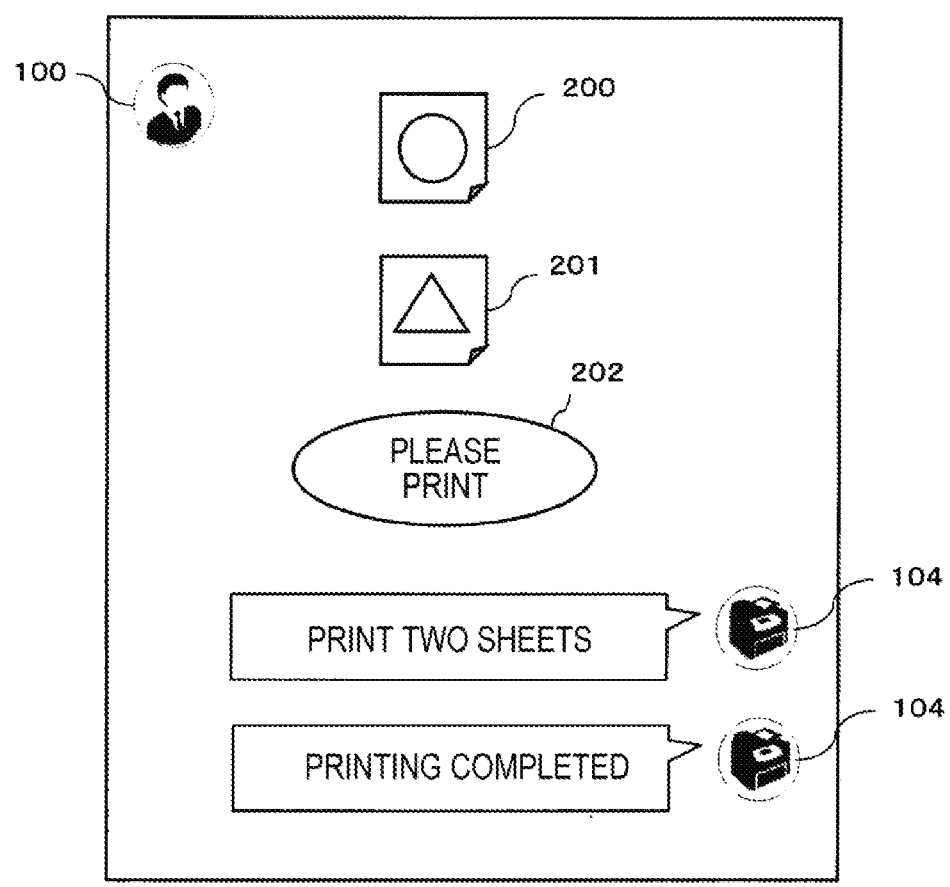
FIG. 18 is a view for explaining a terminal screen according to an eleventh exemplary embodiment.

FIG. 18 illustrates an example of still another terminal screen displayed on the display unit of the user terminal A operated by the user A who has registered the chatbot as a friend.

The user A operates the user terminal A to first transmit the plural documents 200 and 201 and then transmit the permission sticker 202. When receiving the permission sticker 202, since the documents 200 and 201 exist before the permission sticker 202, the chatbot executes the print service for the documents 200 and 201. Since the number of documents transmitted before the permission sticker 202 is two, the chatbot creates and responds with a message saying "Print two sheets". After completion of the printing, the chatbot creates and transmits a message saying "Printing completed".

Twelfth Exemplary Embodiment

Figure 19:
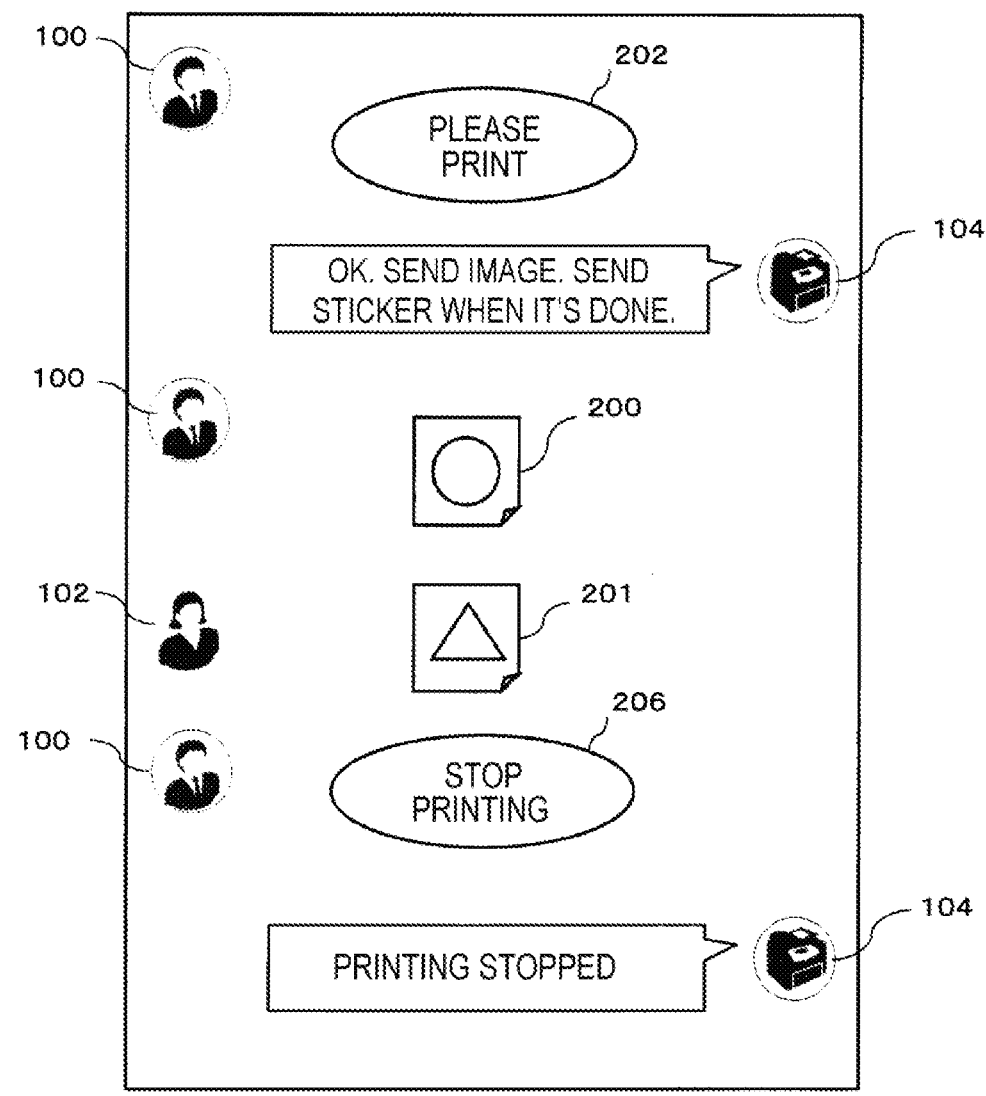
FIG. 19 is a view for explaining a terminal screen according to a twelfth exemplary embodiment.

FIG. 19 illustrates an example of still another terminal screen displayed on the display unit of the user terminal A operated by the user A who has registered the chatbot as a friend.

The user A operates the user terminal A to transmit the permission sticker 202. When receiving the permission sticker 202, the chatbot creates and responds with a message saying "OK! Send an image, and send a sticker when it's done".

The user A Who views this message transmits the document 200.

In the meantime, the user B who views this message transmits the document 201 after the document 200.

The user A who views the document 201 transmitted from the user B transmits the cancellation sticker 206 instead of the permission sticker 202 in order to prevent unintended printing of the document 201 by the user B.

The print service should be executed for the documents between the two permission stickers 202. However, since the two permission stickers 202 do not exist, the chatbot does not execute the print service for the documents 200 and 201, and creates and responds with a message saying "Printing stopped" in accordance with the cancellation sticker 206.

When the user A allows printing of the document 201 transmitted by the user B, the user A only needs to transmit the permission sticker 202 rather than the cancellation sticker 206. In this case, the chatbot executes the print service for the documents 200 and 201 existing between the two permission stickers 202.

Thirteenth Exemplary Embodiment

Figure 20:
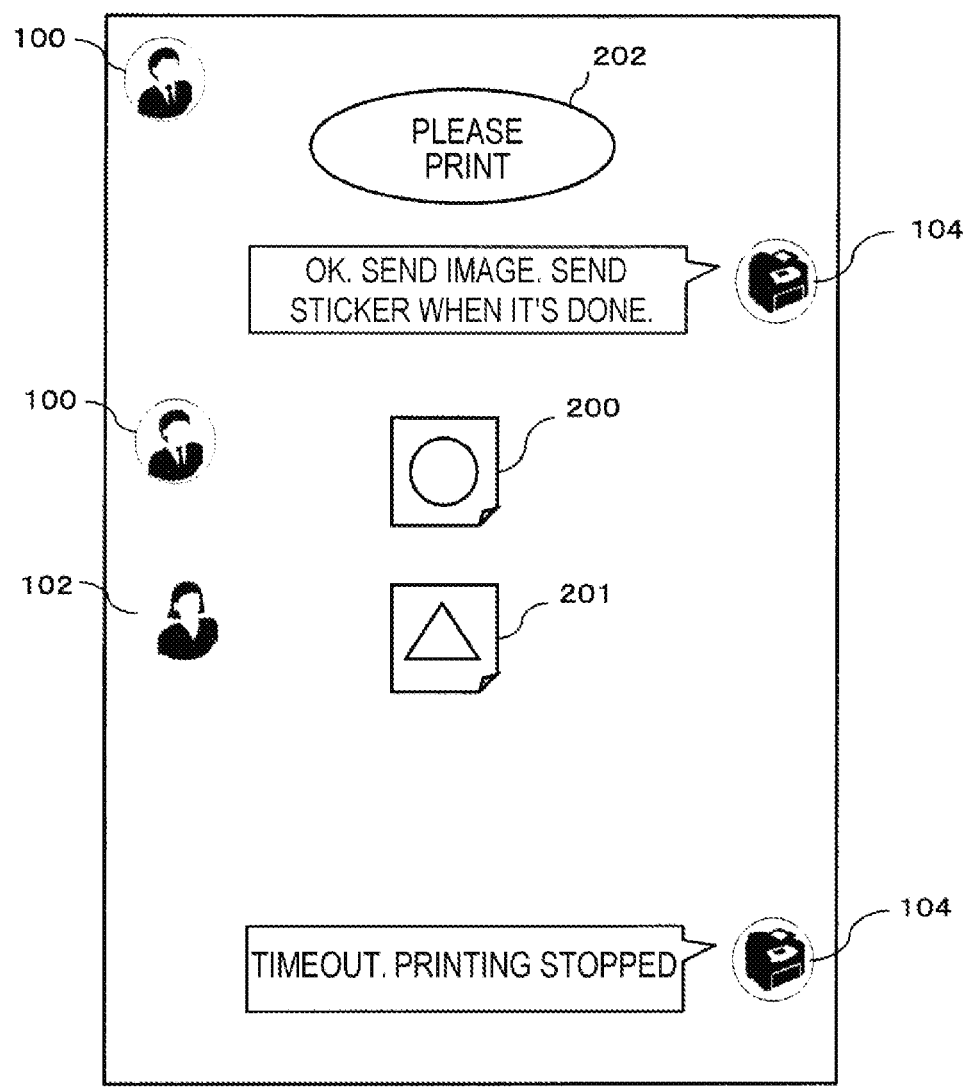
FIG. 20 is a view for explaining a terminal screen according to a thirteenth exemplary embodiment.

FIG. 20 illustrates an example of still another terminal screen displayed on the display unit of the user terminal A operated by the user A who has registered the chatbot as a friend.

The user A operates the user terminal A to transmit the permission sticker 202. When receiving the permission sticker 202, the chatbot creates and responds with a message saying "OK! Send an image, and send a sticker when ifs done".

The user A who views this message transmits the document 200.

In the meantime, the user B who views this message transmits the document 201 after the document 200.

The user A who views the document 201 transmitted from the user B does not transmit the permission sticker 202 again in order to prevent unintended printing of the document 201 by the user B.

Since the second permission sticker 202 does not exist within a predetermined period of time after the first permission sticker 202, the chatbot does not execute the print service for the documents 200 and 201 and creates and responds with a message saying "Timeout. Printing stopped".

Fourteenth Exemplary Embodiment

As described in the first exemplary embodiment, the user A or the user B registers the printer and the setting information by registering the chatbot as a friend, and transmits a message such as "Print" to the chatbot so as to execute a print service with the desired printer and the desired printing conditions.

In the meantime, when the user A and the user B form the same group and are performing a group chat, the user A may want to cause the chatbot which the user A has registered as a friend to join the group chat. It is assumed that the user B has not yet registered the chatbot as a friend. In this case, the user A who has registered the chatbot as a friend and the user B who has not registered the chatbot as a friend exist in the same group chat. At this time, it would be inconvenient if the chatbot automatically responds to a message of the user B who has not registered the chatbot as a friend to provide a print service (from the viewpoint of the user A, the user B prints desirably using the chatbot even though the user A has registered the chatbot as a friend).

Therefore, in the fourteenth exemplary embodiment, when plural users exchange messages in a group chat, the chatbot identifies a user who has transmitted a message. The chatbot determines whether the identified user is a user who has registered the chatbot as a friend. The chatbot provides a print service in automatic response to a print instruction from the user who has registered the chatbot as a friend. However, the chatbot does not provide a print service in automatic response to a print instruction from a user who has not registered the chatbot as a friend. Examples of a manner in which the chatbot does not provide the print service include the followings. That is, (i) the chatbot does not receive (that is, ignores or refuses) a print instruction itself; and (ii) the chatbot receives a print instruction itself but does not execute a print service (puts the print service on hold). Also, (iii) the chatbot indicates that a print service is not provided (that is, refuses the print instruction or puts the print instruction on hold), and (iv) the chatbot does not indicate even that a print service is not provided (that is, ignores the print instruction). When the chatbot puts the print instruction on hold, the chatbot may allow the print if a certain condition is met. In this case, the chatbot provides the print service in response to the certain condition being met, rather than in automatic response to a print instruction from a user who does not have the usage right. When the chatbot indicates that the print service is not provided, for example, the chatbot creates and responds with a message saying "Unprintable" or "Friend registration required for printing". When the chatbot does not indicate even that the print service is not provided, the chatbot neither creates nor responds with a message. In this case, it is difficult to distinguish this operation manner from an abnormality (failure) of the chatbot. Therefore, when a user repeatedly gives a print instruction, the chatbot may create and respond with a certain message.

Figure 26:
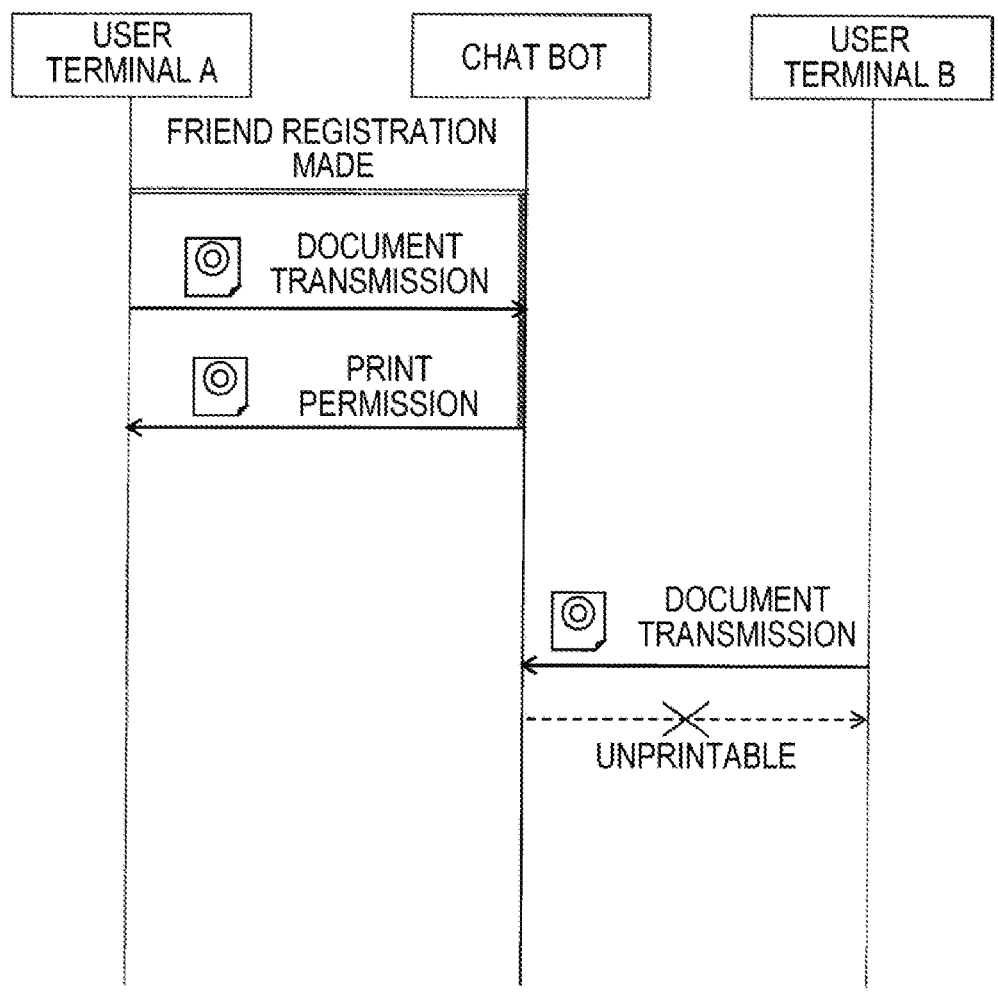
FIG. 26 is a sequence diagram according to a fourteenth exemplary embodiment.

FIG. 26 is a sequence diagram of the fourteenth exemplary embodiment. This is a process performed among the user terminal A operated by the user A, the user terminal B operated by the user B, and the chatbot. It is assumed that the user A, the user B, and the chatbot participate in the same group chat, the user A has registered the chatbot as a friend, and the user B has not registered the chatbot as a friend.

The user A operates the user terminal A to register the chatbot as a friend. The chatbot stores the user ID of the user who has registered the chatbot as a friend in the user information table of the user information storage unit 165.

Next, the user A transmits to the chatbot a message saying "Print" together with a document as image data in the group chat. The document may be a photograph designated by the user A. Alternatively, the document may be a past message history exchanged within the group chat. In this case, for example, the user A transmits a message saying, for example, "Print a chat history in this group". The chatbot extracts a user ID included in the message from the user A. Then, the chatbot refers to the user information table. When the chatbot determines that the user A is a user who has registered the chatbot as a friend, the chatbot executes a print service with a printer and setting information associated with the user A in automatic response to the message. At this time, the chatbot creates and automatically responds with a message saying "Printing completed" to inform the user A that the printing is permitted.

In the meantime, when the user B transmits to the chatbot a message saying "Print" together with a document in the group chat, the chatbot extracts a user ID included in the message from the user B. Then, the chatbot refers to the user information table. When the chatbot determines that the user B is a user who has not registered the chatbot as a friend, the chatbot does not provide the print service in automatic response to the message but ignores the message saying "Print". As a result, the user B does not enjoy the print service using the chatbot. From the viewpoint of the user A, it is possible to prevent the user B who has not registered the chatbot as a friend from desirably printing a past message history in the group chat using the chatbot that the user A has registered as a friend.

Fifteenth Exemplary Embodiment

In the fourteenth exemplary embodiment, the chatbot ignores the message from the user B who has not registered the chatbot as a friend. The chatbot may further inform the user B that printing cannot be performed.

Figure 27:
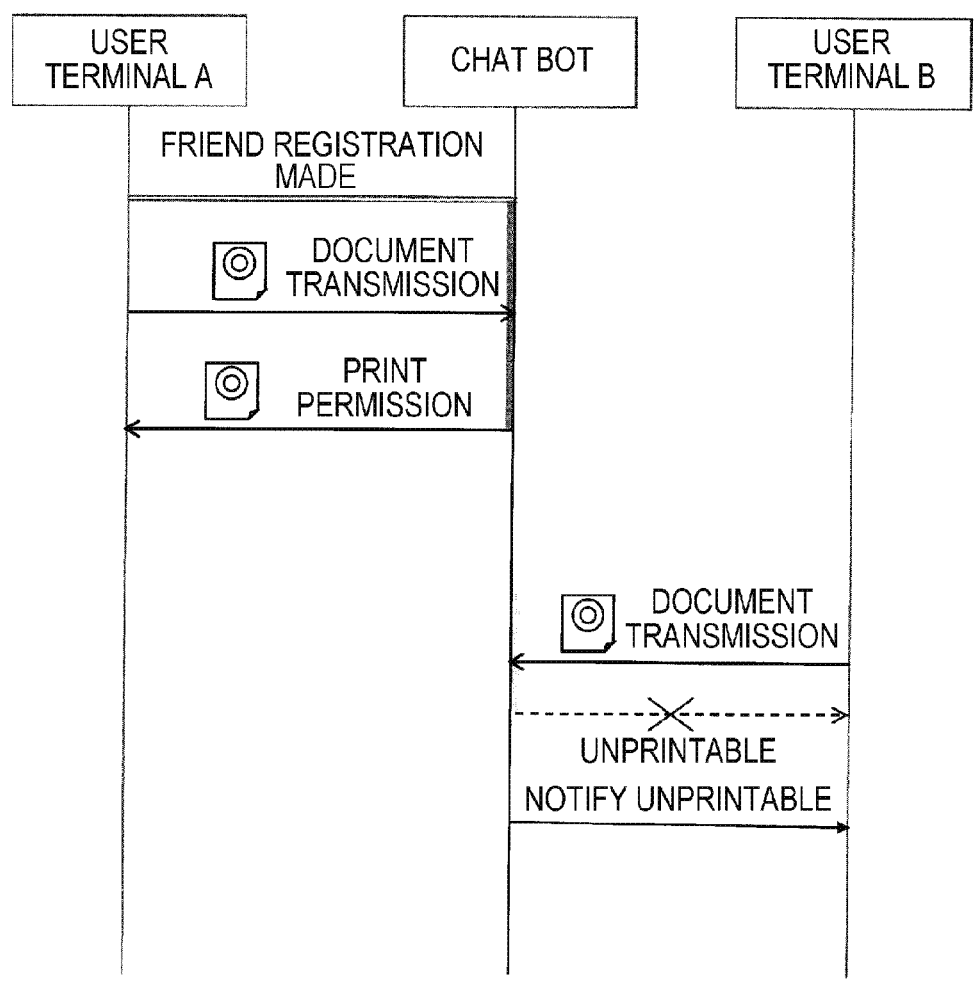
FIG. 27 is a sequence diagram according to a fifteenth exemplary embodiment.

FIG. 27 is a sequence diagram of a fifteenth exemplary embodiment.

In addition to the sequence of FIG. 26, after ignoring the message from the user B, the chatbot further creates a message saying, for example, "Unprintable" and transmits the message to the user B to inform the user B of "Unprintable". This message is a message in the group chat and may be viewed by not only the user B but also other users participating in the group chat, for example, the user A.

By viewing this message, the user B may recognize that a certain action is required to execute the print service. In addition, by viewing this message, the user A may also recognize that a print instruction by the user B has not been executed.

Sixteenth Exemplary Embodiment

In the fourteenth exemplary embodiment, the chatbot ignores the message from the user B who has not registered the chatbot as a friend. The chatbot may further prompt the user B to register the chatbot as a friend.

Figure 28:
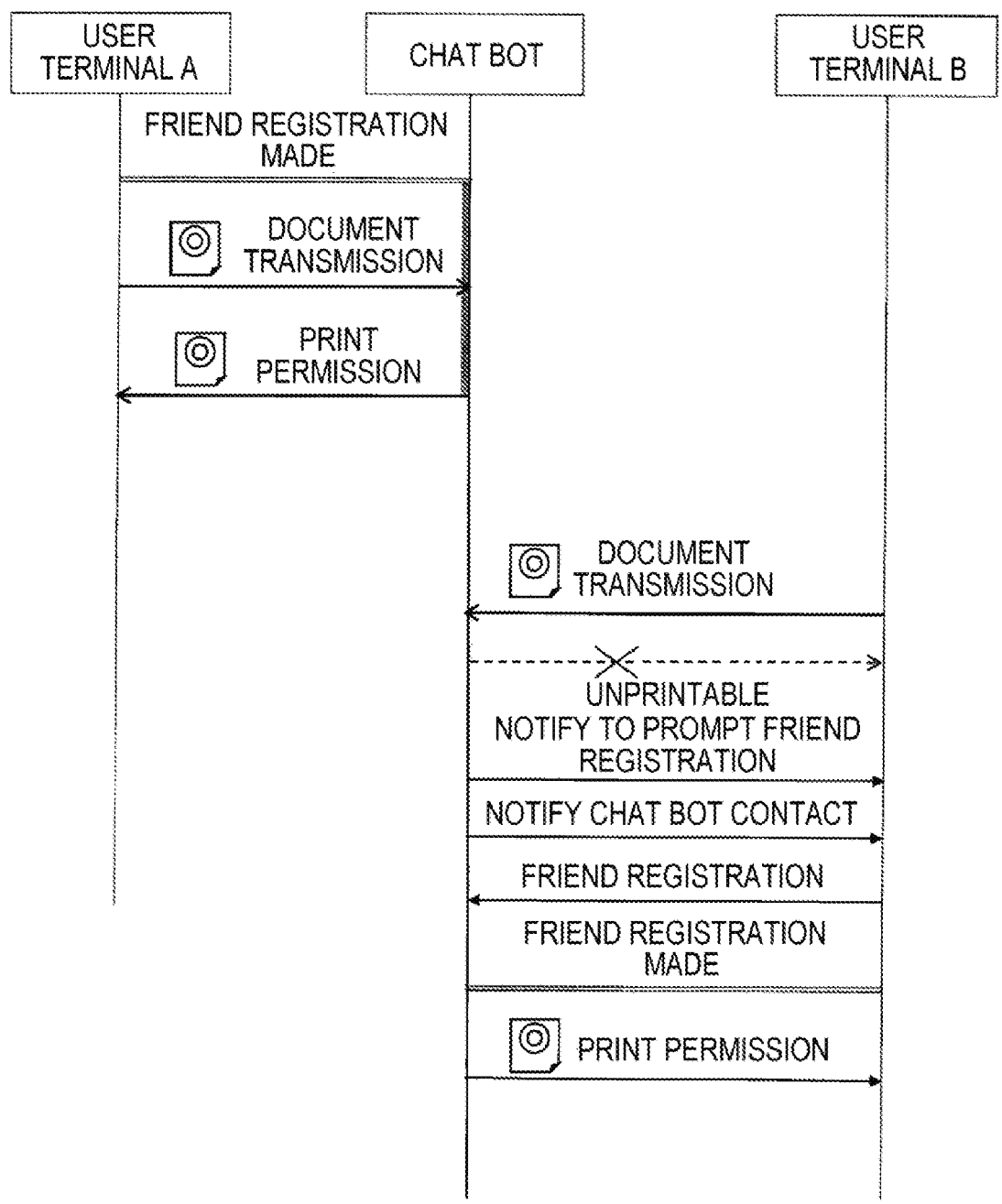
FIG. 28 is a sequence diagram according to a sixteenth exemplary embodiment.

FIG. 28 is a sequence diagram of a sixteenth exemplary embodiment.

In addition to the sequence of FIG. 26, after ignoring the message from the user B, the chatbot further creates a message saying "Friend registration required for printing" and transmits the message to the user B. Together with this message, the chatbot transmits a contact of the chatbot (for example, URL) in the format of a message. Upon viewing this message, the user B recognizes that it is necessary to register the chatbot as a friend in order to execute the print service, and accesses the contact included in the message to register the chatbot as a friend. The chatbot stores the user ID of the user B who has registered the chatbot as a friend in the user information table of the user information storage unit 165 and executes the print service in response to the previously ignored print instruction from the user B.

In this manner, the chatbot may ignore the print instruction from the user B who did not registered the chatbot as a friend and may execute the print instruction according to the fact that the user B has registered the chatbot as a friend.

After the user B registers the chatbot as a friend, the chatbot may create a message saying "Do you want to execute the previous print instruction?", in response to this friend registration. Then, the chatbot may transmit the message to the user B, and execute the print service after receiving a confirmation message from the user B.

Seventeenth Exemplary Embodiment

In the fourteenth exemplary embodiment, the chatbot ignores the message from the user B who has not registered the chatbot as a friend. The chatbot may further prompt the user B to get permission of another user in a group chat who has registered the chatbot as a friend.

Figure 29:
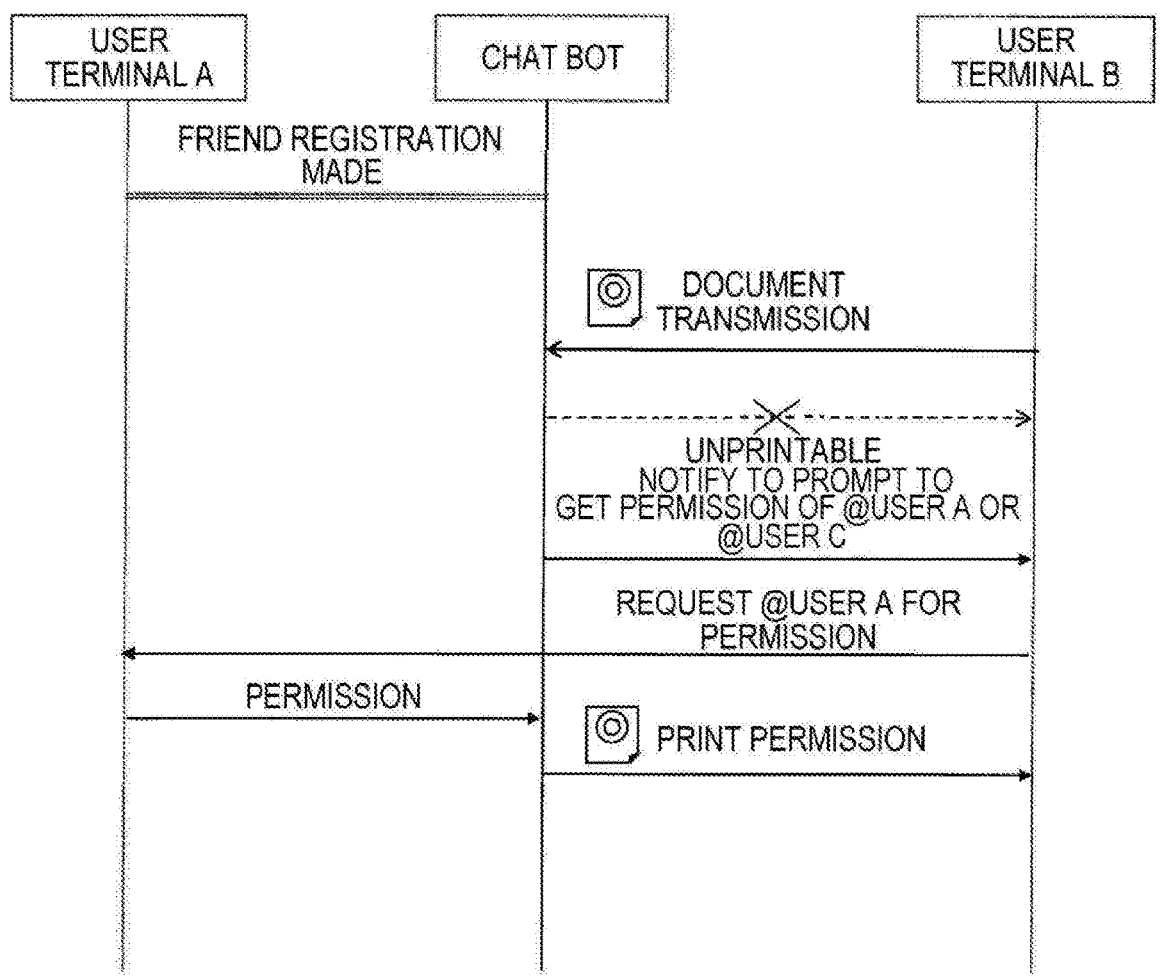
FIG. 29 is a sequence diagram according to a seventeenth exemplary embodiment.

FIG. 29 is a sequence diagram of a seventeenth exemplary embodiment.

In addition to the sequence of FIG. 26, after ignoring the message from the user B, the chatbot further creates a message saying, for example, "Get permission of @user A or @user C for printing" and transmits the message to the user B. Here, the user A and the user C are users who have registered the chatbot as a friend and are users who are extracted by referring to the user information table stored in the user information storage unit 165.

The user B who views this message transmits a message saying, for example, "@user A please permit printing" to the user A participating in the group chat. Here, the expression "@user A" indicates a message directed to a specific user in the group chat (that is, a mention).

When the user A who views this message transmits a message saying, for example, "Printing is OK" to permit printing, the chatbot receives this message, determines that the permission has been given from the user A who has registered the chatbot as a friend, and executes the print service in response to the previously ignored print instruction from the user B.

Even when a message permitting printing is transmitted from a user other than the user A in response to the message saying "@user A please permit printing" from the user B, the chatbot does not execute the print instruction. However, when a message permitting printing is transmitted from the user C who has registered the chatbot as a friend, the chatbot may execute the print instruction even though the user C is a user other than the user A. This is because the user C who views the message saying "@user A please permit printing" in the group chat may permit the printing on behalf of the user A for a certain reason.

Eighteenth Exemplary Embodiment

In the fourteenth to seventeenth exemplary embodiments, the chatbot ignores the print instruction from the user B who has not registered the chatbot as a friend. Alternatively, the chatbot may put the print instruction from the user B who has not registered the chatbot as a friend on hold. Then, the chatbot may release the holding state when a certain condition is met.

Figure 30:
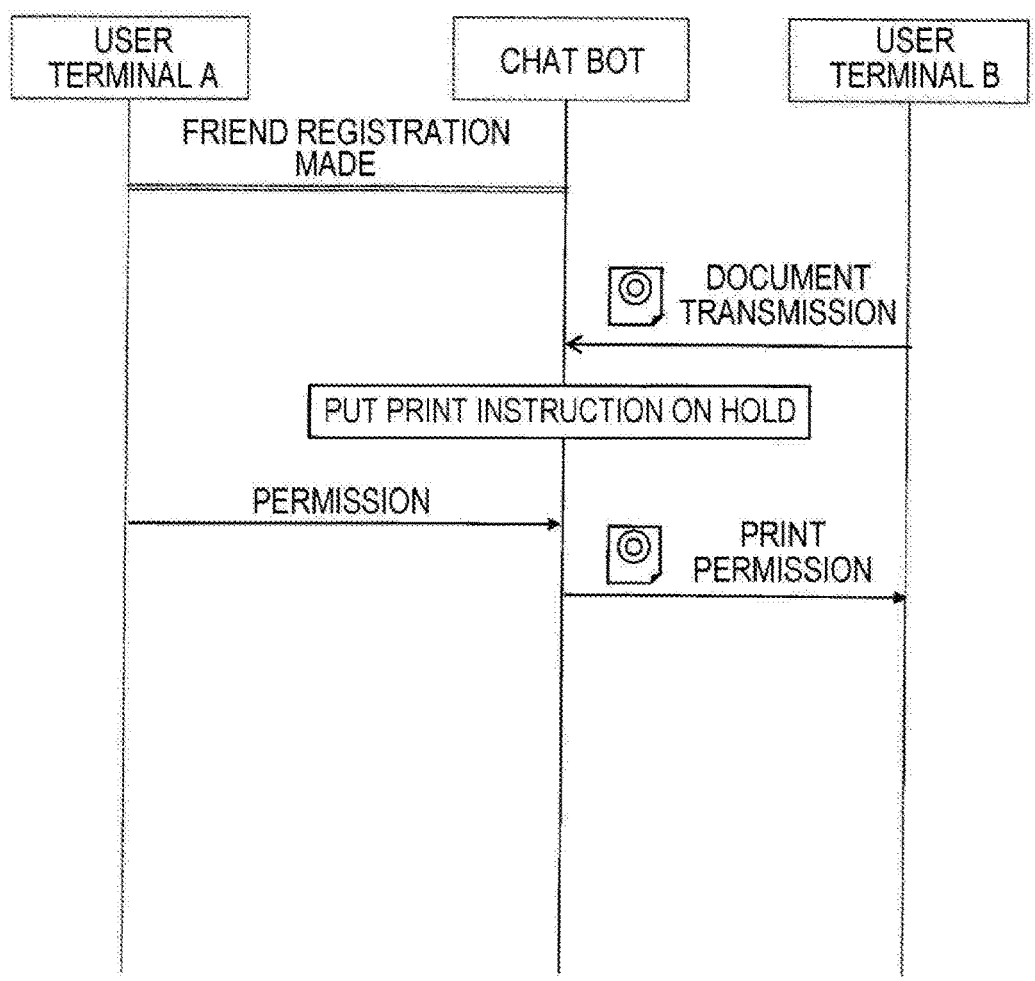
FIG. 30 is a sequence diagram according to an eighteenth exemplary embodiment.

FIG. 30 is a sequence diagram of an eighteenth exemplary embodiment.

The user A operates the user terminal A to register the chatbot as a friend. The chatbot stores the user ID of the user who has registered the chatbot as a friend in the user information table of the user information storage unit 165.

In the meantime, when the user B transmits a message saying "Print" together with a document to the chatbot, the chatbot extracts the user ID included in the message from the user B. Then, the chatbot refers to the user information table. When the chatbot determines that the user B is a user who has not registered the chatbot as a friend, the chatbot does not execute the print service in automatic response to the message but puts the message saying "Print" on hold. The "Print" message from the user B is also viewed by the user A participating in the group chat. Therefore, when the user A who has registered the chatbot as a friend permits the printing by transmitting a message saying, for example, "OK" in response to the message of "Print" of the user B while the print instruction is on hold, the chatbot releases the holding state of the print instruction of the user B in accordance with the message from the user A and executes the print service.

Also, in the eighteenth exemplary embodiment, the chatbot puts the print instruction on hold without executing the print service in automatic response to the message from the user B. The chatbot instructs the printing in accordance with the message from the user A. Therefore, it can be said that the chatbot controls the print service not to be executed, according to the print instruction from the user B.

Even when a message to permit the printing is transmitted from a user who has not registered the chatbot as a friend while the print instruction is on hold, the chatbot maintains the holding state of the print instruction as it is. In addition, when there is no message to permit the printing from another user while the print instruction is on hold, the chatbot maintains the holding state as it is. When the holding state continues for a certain period of time, the chatbot may execute a process such as discarding the print instruction.

Nineteenth Exemplary Embodiment

In the eighteenth exemplary embodiment, the user A who has registered the chatbot as a friend permits the printing of the user B. This permission may be made while the user A is viewing a document included in the message of the user B.

Figure 31:
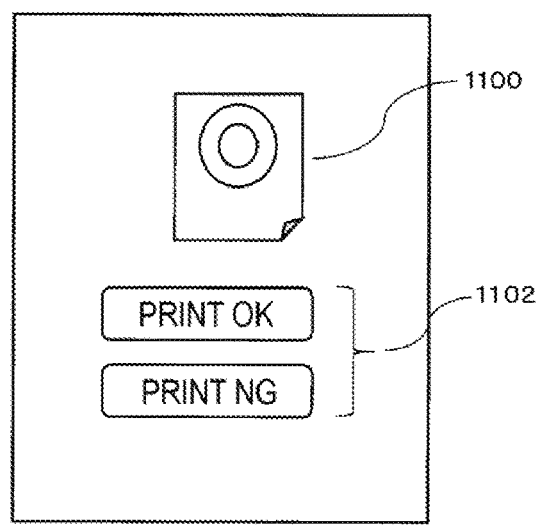
FIG. 31 is a view (part 1) for explaining a user terminal screen according to a nineteenth exemplary embodiment.

FIG. 31 illustrates an example of a screen displayed on the display unit of the user terminal A while the chatbot is putting the print instruction from the user B on hold. When the user A, for example, browses or taps on the message of the user B, a document 1100 included in the message is displayed. Furthermore, displayed is buttons 1102 to transmit a message as to whether to permit or refuse printing in association with this document. The buttons 1102 includes two buttons "Print OK" and "Print NG". In FIG. 31, a photograph is illustrated as the document 1100. The document 1100 may be a message history in a group Chat, as described above.

When the user A determines that he/she allows printing of the document 1100 while viewing the document 1100 displayed on the screen, the user A operates the "Print OK" button to transmit a message permitting the printing. In the meantime, when the user A determines that it is not appropriate to print this document 1100, the user A operates the "Print NG" button to refuse the printing.

Figure 32:
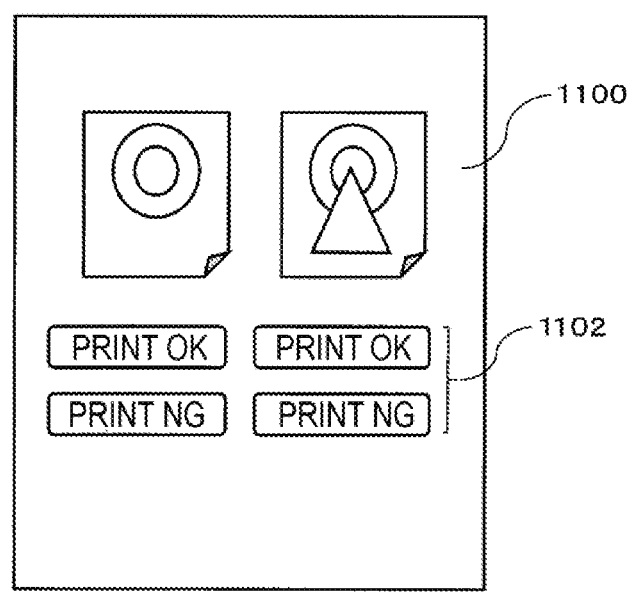
FIG. 32 is a view (part 2) for explaining a user terminal screen according to the nineteenth exemplary embodiment.

FIG. 32 illustrates an example of a screen displayed on the display unit of the user terminal A when plural documents are included in the message of the user B. The plural documents 1100 included in the message of the user B are displayed horizontally. The buttons 1102 to transmit a message as to whether to permit or refuse the printing are displayed in association with each document 1100. By operating these buttons 1102, the user A selects whether to permit or refuse the printing of each of the plural documents 1100. For example, the user permits the printing of the first document and refuses the printing of the second document. The chatbot releases only the holding state of the print instruction associated with a document for which the printing permission is given, and executes the print service.

Since the user B may view the print permission message or the refusal message for each document from the user A in the group chat, the user B may recognize that the user A refuses the imprinted document.

Twentieth Exemplary Embodiment

In the eighteenth exemplary embodiment, the chatbot puts the print instruction from the user B in the holding state. The chatbot may further inform users in the group chat that the print instruction is in the holding state.

Figure 33A:
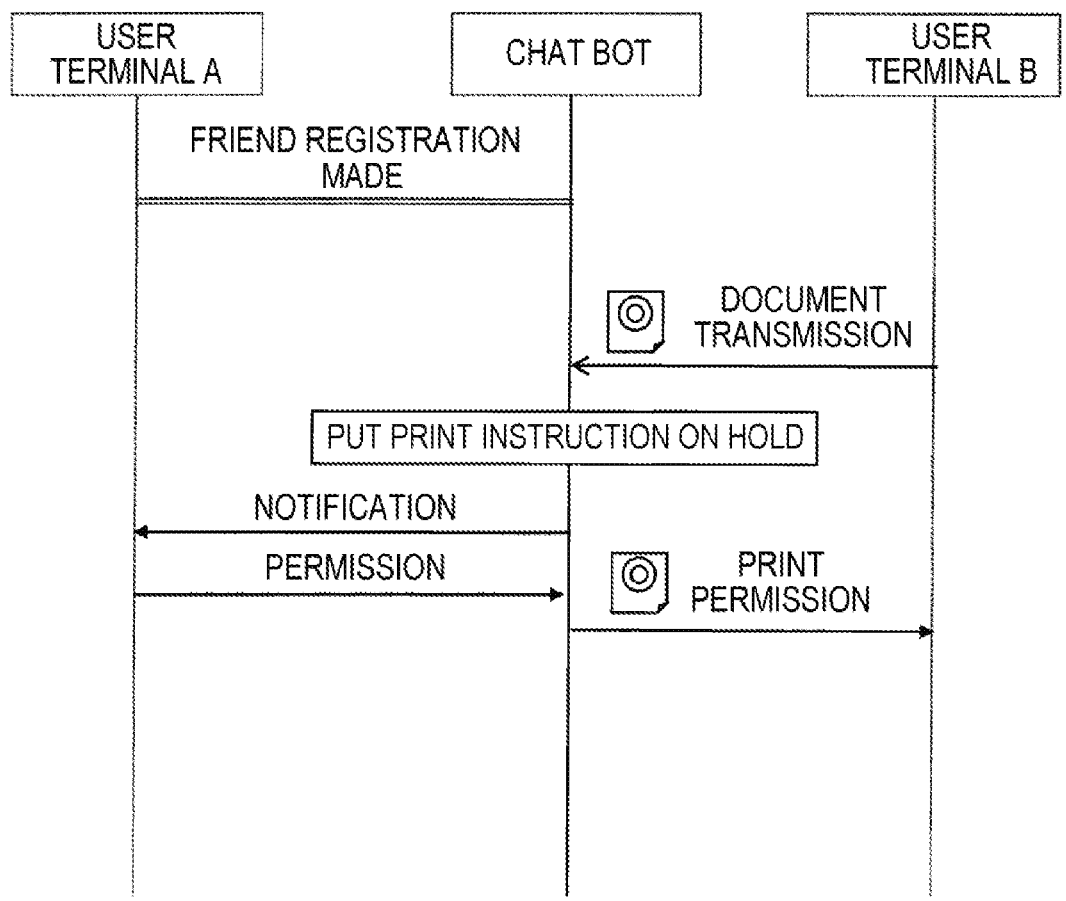
FIG. 33A is a sequence diagram (part 1) according to a twentieth exemplary embodiment.

FIG. 33A is a sequence diagram of the twentieth exemplary embodiment.

The user A operates the user terminal A to register the chatbot as a friend. The chatbot stores a user ID of the user who has registered the chatbot as a friend in the user information storage unit 165.

In the meantime, when the user B transmits a message saying "Print" together with a document to the chatbot, the chatbot extracts the user ID included in the message from the user B and determines that the user B is a user who has not registered the chatbot as a friend. Then, the chatbot does not provide the print service in automatic response to the message and puts the message saying "Print" on hold.

Next, the chatbot notifies a user in the group chat who has registered the chatbot as a friend that the print instruction from the user B is on hold. Here, the notification may be made in any of the following manners: (i) a message is transmitted only to users who have registered the chatbot as a friend in a private manner by e-mail or the like (the other users cannot view the message) and (ii) the message is transmitted to all users in the group chat and it is indicated that a message is directed to specific users (the other users also view this message). In the latter case, for example, the chatbot creates a message saying "@user A please permit printing" and notifies the message to the group chat. Here, "@user A" indicates a message directed to a specific user A in the group chat (that is, a mention). Further, the private notification may also include a notification to the user in another group where the user and the chatbot perform a one-on-one chat.

When the user A transmits a message saying, for example, "OK" in response to such a message to permit the printing, the chatbot releases the holding state of the print instruction of the user B in accordance with the message from the user A and executes the print service.

When plural users have registered the chatbot as a friend, the chatbot may notify the message to all of such plural users.

Figure 33B:
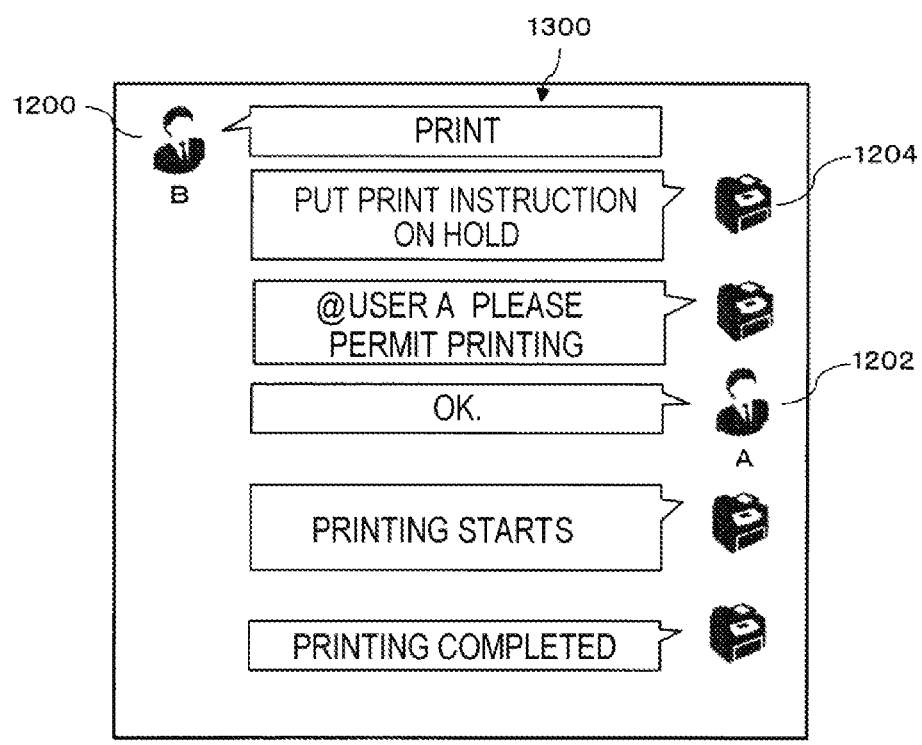
FIG. 33B is a view for explaining display of a user terminal screen according to the twentieth exemplary embodiment.

FIG. 33B illustrates an example of a screen displayed on the display unit of the user terminal B.

On the screen of the user terminal B, a visual representation figure (icon) 1200 representing the user B, an icon 1202 representing the user A, and an icon 1204 representing the chatbot are displayed by the chat service server 14. Then, messages 1300 of the user A, the user B, and the chatbot are displayed from the top to the bottom in a chronological order.

In FIG. 33B, the user B first transmits a message saying "Print" to the chatbot. A document as image data to be printed is transmitted together with the message instructing the printing.

Upon receiving this message, the chatbot puts the message of the print instruction on hold since the user B is a user who has not registered the chatbot as a friend. Then, the chatbot specifies the user A as a user who has registered the chatbot as a friend, and creates and automatically responds with a message saying "Put printing on hold" and "@user A please permit printing".

Since this message is also viewed by the user A in the group chat, the user A transmits a message saying "OK" in response to this message.

Upon receiving the message from the user A, the chatbot releases the holding state of the print instruction, creates and transmits a message saying "Printing starts". Furthermore, the chatbot creates and transmits a message saying "Printing completed" when the printing is completed.

Upon viewing the screen of FIG. 33B, the user B recognizes that the print service has been executed because of the permission from the user A. In addition, upon viewing the notification from the chatbot, the user A may recognize that the print instruction of the user B has been executed since the user A gives the permission.

A processing algorithm in the chatbot will be described in detail below.

Step 1: The chatbot registers the user A as a friend in response to a specific operation by the user A, that is, the user A operating a button "friend registration" with designating an account of the chatbot. Then, the chatbot stores the user ID of the user A in the user information table.

Step 2: Upon receiving a message from the user B, the chatbot analyzes the contents of the message, extracts the user ID included in the message, extracts a keyword of "Print" included in the message, and interprets the message as a print instruction. The chatbot refers to the user information table to determine whether the user B is a user who has registered the chatbot as a friend.

Step 3: When the chatbot determines that the user B is the user who has registered the chatbot as a friend as a result of the determination in Step 2, the chatbot executes the print instruction to provide the print service. When the user B is a user who has not registered the chatbot as a friend, the chatbot puts the print instruction on hold without executing the print instruction.

Step 4: When putting the print instruction on hold, the chatbot refers to the user information table to extract a user who has registered the chatbot as a friend. When another user (for example, the user A) participating in the group chat has registered the chatbot as a friend, the chatbot specifies this other user.

Step 5: The chatbot creates and transmits a message to the user A specified in Step 4. Thereafter, the chatbot transitions to a state of waiting for a reply from the user A.

Step 6: The chatbot receives a reply message from the user A and analyzes the reply message to determine whether the reply message is permission or refusal. When the reply message is permission, the chatbot releases the held print instruction and executes the printing to provide the print service. When the reply message is refusal, the chatbot does not release the holding state. Even when receiving a reply message from a user other than user A, the chatbot does not release the holding state.

Step 7: After providing the print service, the chatbot creates and transmits a message of printing completion.

Figure 34:
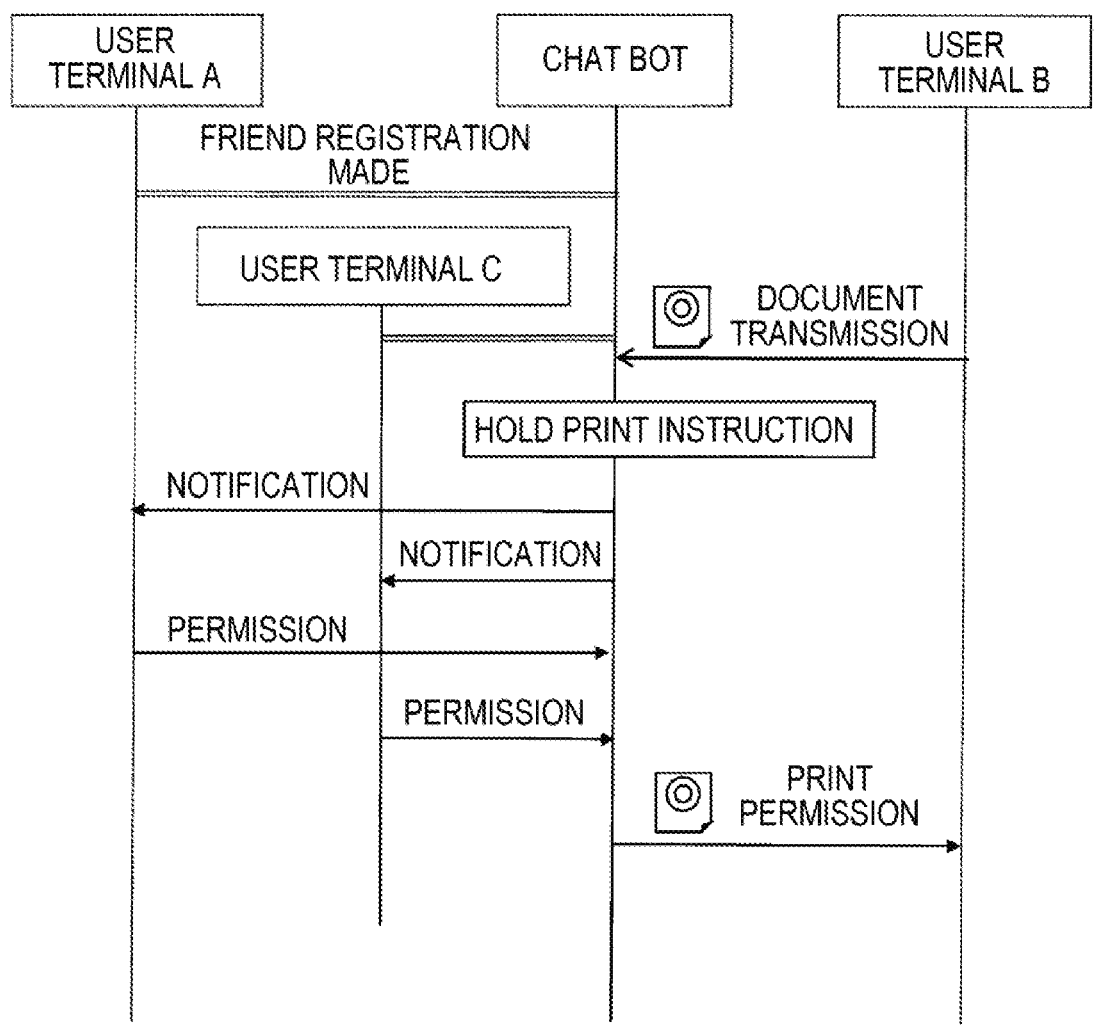
FIG. 34 is a sequence diagram (part 2) according to the twentieth exemplary embodiment.

FIG. 34 illustrates an example where the user A and the user C have registered the chatbot as a friend.

The chatbot extracts the user ID included in the message from the user B. When the chatbot determines that the user B is a user who has not registered the chatbot as a friend, the chatbot does not provide the print service in automatic response to the message and puts the message saying "Print" on hold.

Next, the chatbot notifies a user who has registered the chatbot as a friend that the print instruction from the user B is on hold. Also, as in the previous message, in this case, the notification may be made in any of the following manners: (i) a message is transmitted only to users who have registered the chatbot as a friend in a private manner by e-mail or the like (the other users cannot view the message) and (ii) the message is transmitted to all users in the group chart and it is indicated that a message is directed to specific users (the other users also view this message). For example, the chatbot creates a message saying "@user A @user C please permit printing" and notifies the message to the group chat. Besides the above message, the chatbot may create a message saying "My friends, please permit printing" and notify the message to the group chat.

Further, for example, as time goes on, the chatbot may sequentially change the contents of the message so as to expand the notification targets.

When the user A and the user C transmit a message saying, for example, "OK" in response to such a message and permits the printing, the chatbot releases the holding state of the print instruction of the user B in accordance with the messages from the user A and the user C and executes the print service.

Here, when there are plural users who have registered the chatbot as a friend, the condition for the chatbot to release the holding state of the print instruction from the user B may be any of (1) a condition that any of the plural users who have registered the chatbot as a friend gives a permission, (2) a condition that a majority of the plural users who have registered the chatbot as a friend give a permission, (3) a condition that ⅔ of the plural users who have registered the chatbot as a friend give a permission, and (4) a condition that all of the plural users who have registered the chatbot as a friend give a permission. The condition may be adaptively changed according to the importance of a document included in the message from the user B. Alternatively, when there are a user who has permitted the printing and a user who has refused the printing, the print instruction may be refused uniformly.

Further, in the twentieth embodiment, a user who is notified of the fact that the chatbot puts the prim instruction on hold may be a user specified by the user B. For example, when the user B desires a permission from the user C, the user B transmits a message saving "I want permission of @user C" to the chatbot. In response to this message, the chatbot creates a message saying "@user C please permit printing" and notifies the message to the group chat.

Twenty-First Exemplary Embodiment

In the twentieth embodiment, the chatbot notifies the message to the user who has registered the chatbot as a friend in the group chat. If there is no user who has registered the chatbot as a friend in the group chat, the chatbot may notify the message to a user who has registered the chatbot as a friend outside the group chat. Such a situation may occur, for example, when the user A who has registered the chatbot as a friend, the user B who has not registered the chatbot as a friend, and the chatbot participate in the same group chat and thereafter the user A leaves from the group chat due to a certain reason.

Figure 35:
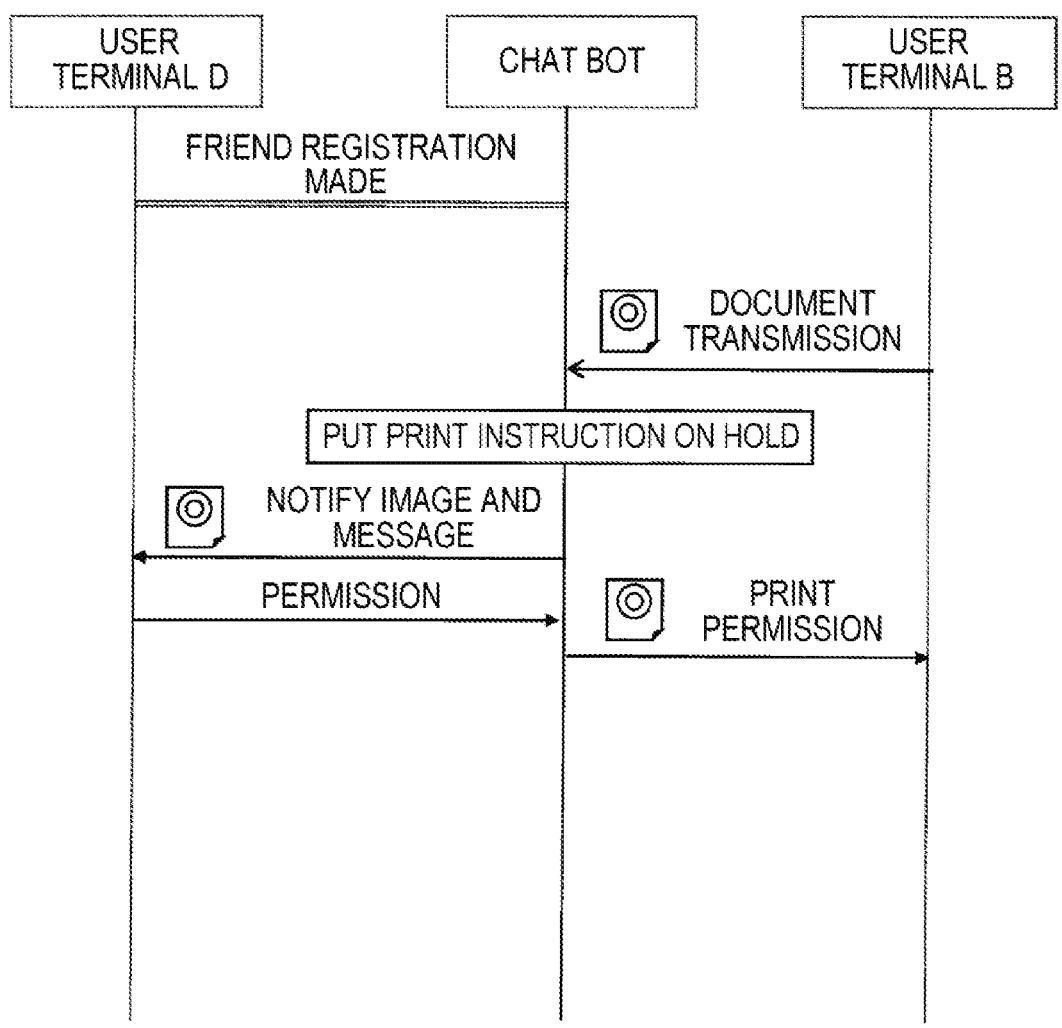
FIG. 35 is a view for explaining the sequence according to a twenty-first exemplary embodiment.

FIG. 35 is a sequence diagram of a twenty-first exemplary embodiment. It is assumed that a user D has registered the chatbot as a friend but does not participate in the same group chat as the user B.

The chatbot extracts the user ID included in the message from the user B. When the chatbot determines that the user B is a user who has not registered the chatbot as a friend, the chatbot does not provide the print service in automatic response to the message and puts the message saying "Print" on hold.

Next, the chatbot notifies a user who has registered the chatbot as a friend that the print instruction from the user B is on hold. When there is no user who has registered the chatbot as a friend in the same group chat, the chatbot refers to the user information table stored in the user information storage unit 165 to determine whether there is another user who has registered the chatbot as a friend. Since the user D does not exist in the same group chat but has registered the chatbot as a friend, the chatbot creates a message saying "@user B instructed to print this photograph. It is on hold" and notifies the message to the user D in a private manner by e-mail or the like. At this time, since the user D is not participating in the same group chat and may not view the document transmitted from the user B, the chatbot notifies the document transmitted from the user B, that is, notifies the service target together.

When the user D confirms the document, transmits a message saying, for example, "OK" to the chatbot in response to such a notification and permits printing, the chatbot releases the holding state of the print instruction of the user B in accordance with the message from the user D and executes the print service.

In addition, when notifying a message to a user who has registered the chatbot as a friend outside the group chat, the chatbot may notify the message using a notification destination priority list. A higher priority may be given to a user previously participating in the group chat. A higher priority may be given to a user having the relatively large number of message exchanges with the user B. Of course, the user B may specify a user who has registered the chatbot as a friend outside the group chat and transmit a message to the chatbot. For example, the user B transmits a message saying, for example, "I want permission of @user D".

Twenty-Second Exemplary Embodiment

In the twentieth exemplary embodiment, the chatbot notifies a message to a user who has registered the chatbot as a friend in the group chat. If the chatbot does not receive a reply message within a certain period of time even after notifying the message to the user who has registered the chatbot as a friend, the chatbot may notify the message again the certain number of times. In addition, when the chatbot does not receive a reply message even after notifying the message again the certain number of times, the chatbot may release the holding state of the print instruction from the user B and discard the print instruction.

Figure 36:
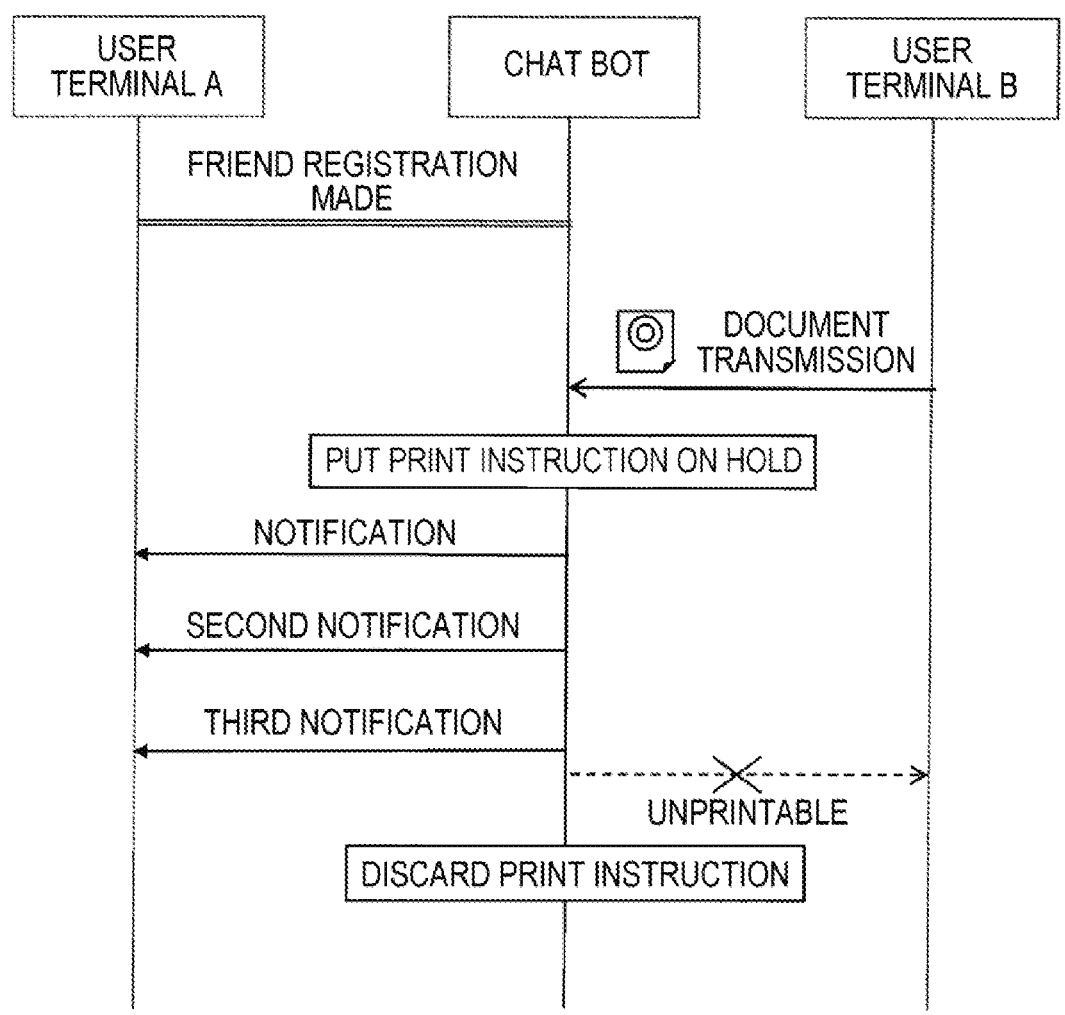
FIG. 36 is a sequence diagram according to a twenty-second exemplary embodiment.

FIG. 36 is a sequence diagram of a twenty-second exemplary embodiment.

When the user B transmits a message saying "Print" to the chatbot together with a document, the chatbot extracts the user ID included in the message from the user B and determines that the user B is a user who has not registered the chatbot as a friend. Then, the chatbot does not provide the print service in automatic response to the message and puts the message saying "Print" on hold.

Next, the chatbot notifies a user who has registered the chatbot as a friend that the print instruction from the user B is on hold. Also, as in the previous message, in this case, the notification may be made in any of the following manners: (i) a message is transmitted only to users who have registered the chatbot as a friend in a private manner by e-mail or the like (the other users cannot view the message) and (ii) the message is transmitted to all users in the group chat and it is indicated that a message is directed to specific users (the other users also view this message). For example, the chatbot creates a message saying "@user A please permit printing" and notifies the message to the group chat.

When the user A does not transmit any reply message within a certain period of time in response to such a message, the chatbot creates and notifies again a message saying "@user A please permit printing soon" to the user A.

When the user A does not transmit any reply message within a certain period of time even in response to such a message, the chatbot further creates and notifies again a message saying "@user A it expires soon" to the user A.

When the chatbot does not receive a reply message from the user A even after repeatedly notifying the message to the user A the certain number of times, the chatbot releases the holding state of the print instruction from the user B and discards the print instruction. When discarding the print instruction, the chatbot may automatically respond to the user B with the fact that the print instruction has been discarded.

In addition, when the chatbot does not receive a reply message from the user A even after repeatedly notifying the message to the user A the certain number of times, the chatbot may notify another user C who has registered the chatbot as a friend of the fact that the print instruction from the user B is on hold. For example, the chatbot may create and notify again a message saying "@user C please permit printing" or "no reply from @user A. @user C please permit printing".

Twenty-Third Exemplary Embodiment

In the twentieth embodiment, the chatbot notifies a message to a user who has registered the chatbot as a friend in the group chat. When the user explicitly refuses this notification without giving any permission, the chatbot may release the holding state of the print instruction from the user B and discard the print instruction immediately.

Figure 37:
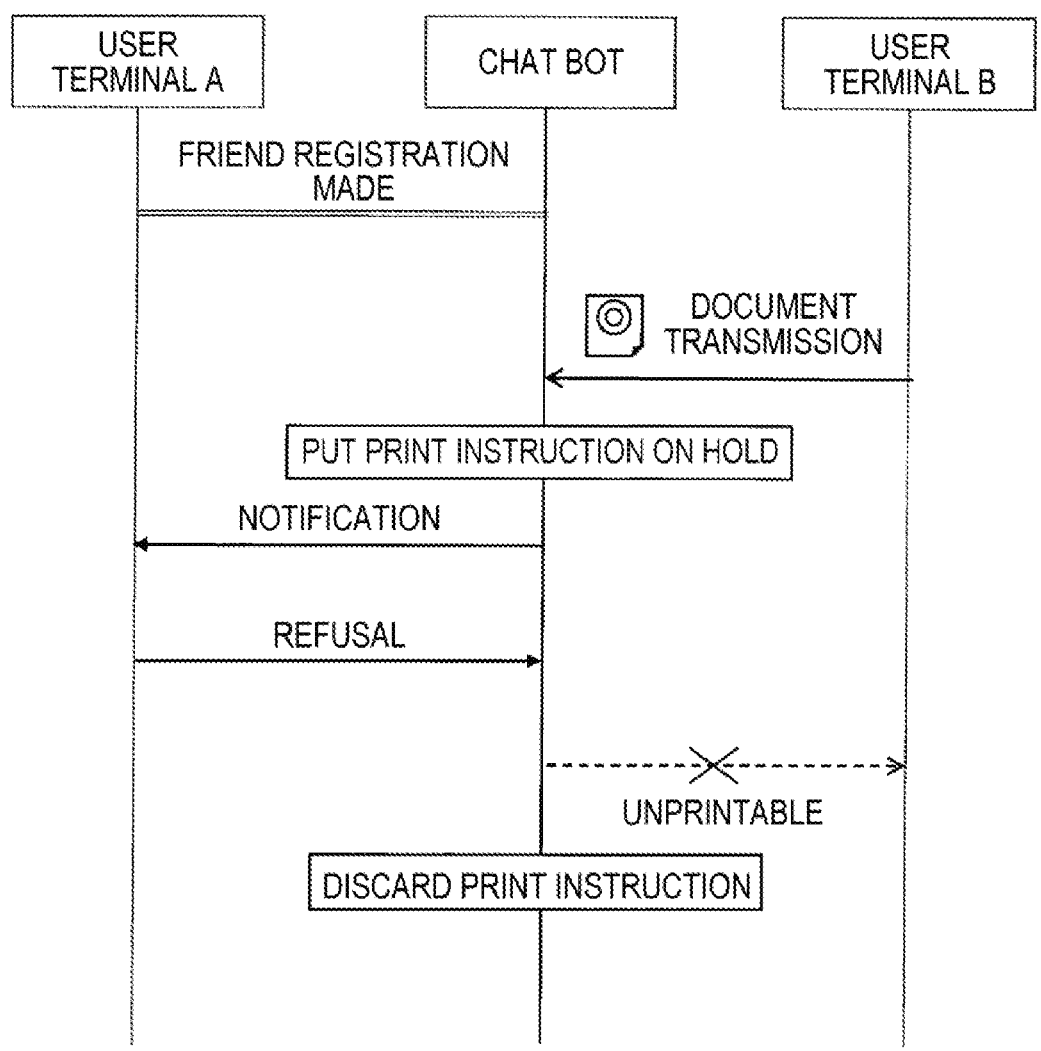
FIG. 37 is a view for explaining the sequence according to a twenty-third exemplary embodiment.

FIG. 37 is a sequence diagram of a twenty-third exemplary embodiment.

When the user B transmits a message saying "Print" to the chatbot together with a document, the chatbot extracts the user ID included in the message from the user B and determines that the user B is a user who has not registered the chatbot as a friend. Then, the chatbot does not provide the print service in automatic response to the message and puts the message saying "Print" on hold.

Next, the chatbot notifies a user who has registered the chatbot as a friend that the print instruction from the user B is on hold. For example, the chatbot creates a message saying "@user A please permit printing" and notifies the message to the group chat.

When the user A transmits a message saying, for example, "Not permitted" or "Print NG" in response to such a message, the chatbot releases the holding state of the print instruction from the user B and immediately discards the print instruction. When discarding the print instruction, the chatbot may automatically respond to the user B with the fact that the print instruction has been refused by another user and that the print instruction has been discarded.

The exemplary embodiments of the present disclosure have been described above. It should be noted that the present disclosure is not limited to these exemplary embodiments, but various modifications may be made. The modifications will be described below.

First Modification

In the first to thirteenth exemplary embodiments, the examples has been described where the user A, the user B, and the chatbot form the same group chat. It should be noted that more users may form the same group chat. In this case, when there are plural users who have registered the chatbot as a friend, any user may transmit the permission sticker.

Figure 21:
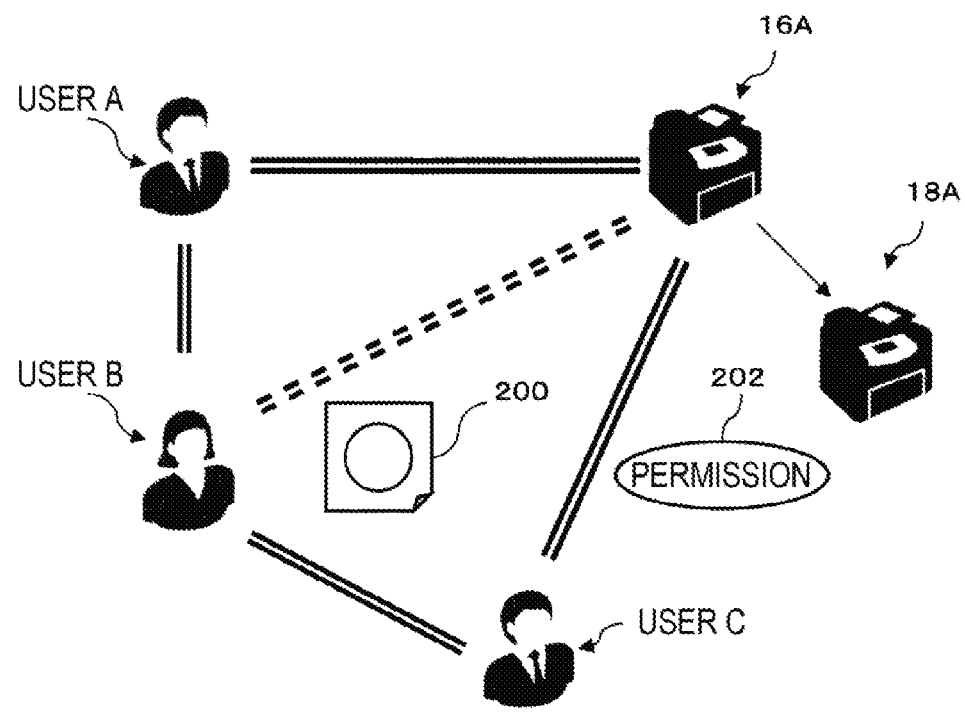
FIG. 21 is a view for explaining a process according to a first modification.

FIG. 21 illustrates an example in which where the user A, the user B, the user C, and the chatbot form the same group chat. It is assumed that the user A and the user C have registered the chatbot as a friend, that the user B has not registered the chatbot as a friend, and that the user A invites the chatbot to the group chat.

The user B who has not registered the chatbot as a friend transmits the document 200. In this state, since a permission sticker 202 does not exist, the document 200 is not printed.

When the user C participating in the group chat transmits the permission sticker 202 after the transmission of the document 200, the permission sticker 202 exists in association with the document 200. Therefore, the chatbot executes the print service of the document 200. Of course, even when the permission sticker 202 is transmitted from the user A instead of the user C, the print service for the document 200 is similarly executed.

Second Modification

In the first to thirteenth embodiments, the examples are described in which the user B who has not registered the chatbot as a friend acquires the permission sticker 202 from the user A who has registered the chatbot as a friend and transmits the acquired permission sticker 202 to the chatbot. When providing the permission sticker to the user B, the user A may set an expiration date of the permission sticker 202 or set a limit to the number of times the permission sticker 202 can be used. Similarly, when the chatbot provides the permission sticker to a user who has registered the chatbot as a friend, the chatbot may set the expiration date of the permission sticker or set a limit to the number of times the permission sticker can be used. The set expiration date of the permission sticker or the limit of the number of times the permission sticker can be used is stored in the storage device 16g together with the ID of the permission sticker. For example, the permission sticker ID=001, the providing destination=user A, the expiration date=Mar. 1, 2018, and the like.

Figure 22:
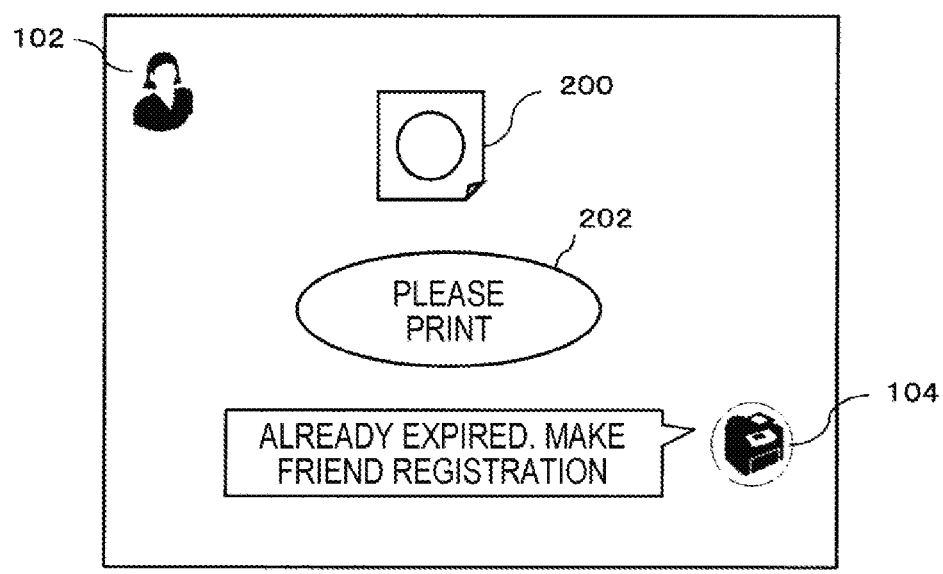
FIG. 22 is a view for explaining a terminal screen according to a second modification.

FIG. 22 illustrates an example of a screen in a case where the expiration date is set to the permission sticker 202.

The user B transmits the document 200 and then transmits the permission sticker 202. When receiving the permission sticker 202, the chatbot specifies the expiration date based on the ID of the permission sticker 202 and executes the print service of the document 200 if the current date and time is before the expiration date. On the other hand, when the expiration date has passed, the chatbot does not execute the print service and creates and responds with a message saying "Already expired. Make a friend registration" to notify the user B of the fact that the print service is not executed and to prompt the user B to register the chatbot as a friend.

Third Modification

Figure 23:
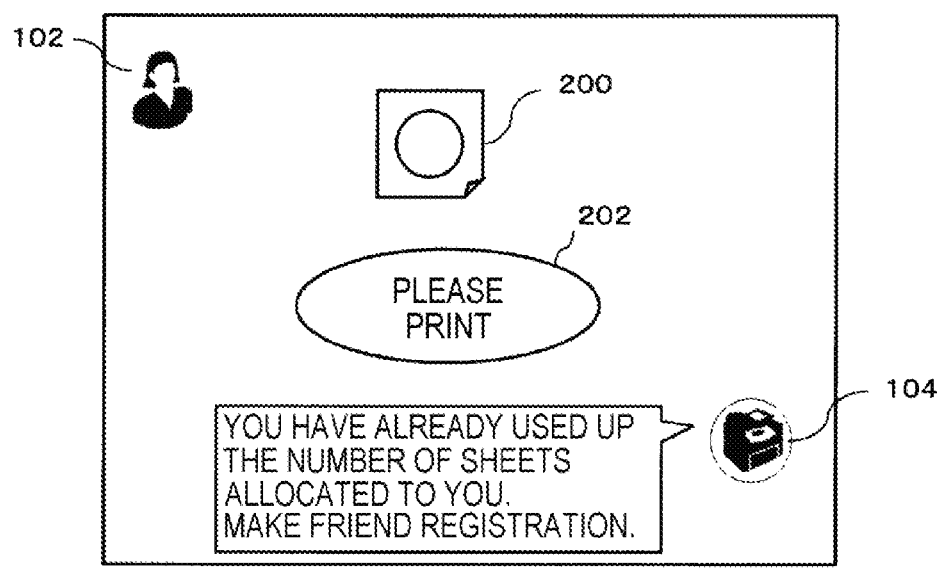
FIG. 23 is a view for explaining a terminal screen according to a third modification.

FIG. 23 illustrates an example of a screen in a case where the limit is set to the number of time the permission sticker 202 can be used. For example, the chatbot sets the permission sticker ID=001, the providing destination=user A, and the limit of the number of times the permission sticker can be used=2 and stores the set information in the storage device 16g. Every time the chatbot receives the permission sticker 202 and executes the print service, the chatbot sequentially increments the number of times the permission sticker is used and stores it in the storage device 16g in association with the ID of the permission sticker 202.

The user B transmits the document 200 and then transmits the permission sticker 202. When receiving the permission sticker 202, the chatbot specifies the limit of the number of times the permission sticker 202 can be used based on the ID of the permission sticker 202 and executes the print service of the document 200 if the number of times the permission sticker 202 has been used is less than the limit. On the other hand, when the number of times the permission sticker 202 has been used reaches the limit, the chatbot does not execute the print service and creates and responds with a message saying "You have already used up sheets allocated to you. Make a friend registration".

Fourth Modification

In the first to thirteenth exemplary embodiments, an electronic sticker that can be transmitted and received as service permission information has been described. Any authenticity assurance technique may be used to prevent forgery or tampering of a permission sticker and a cancellation sticker as electronic stickers. For example, the operation controller 163 calculates hash values based on the permission sticker and the cancellation sticker together with user-specific information (a user ID and the like) when giving the permission sticker and the cancellation sticker to a user having the usage right, and stores the calculated hash value in the user information storage unit 165. Then, when the permission sticker or the cancellation sticker is included in a message transmitted from a user, the operation controller 163 compares a hash value of the received permission sticker or cancellation sticker with the hash value stored in the user information storage unit 165 to determine whether the received permission sticker or cancellation sticker is an authentic sticker.

Fifth Modification

In the exemplary embodiments, the examples has been described in which the chatbot provides a print service according to a message from a user. The chatbot may provide any other services. Examples of the services that the chatbot may provide include the followings:

- search services for music, news articles, accommodation facilities, books, or cooking recipes.
- a ticket reservation service.
- a service for putting up on a Ilea market, searching the flea market, or transaction communication on the flea market.
- a translation service into another language.

Figure 24:
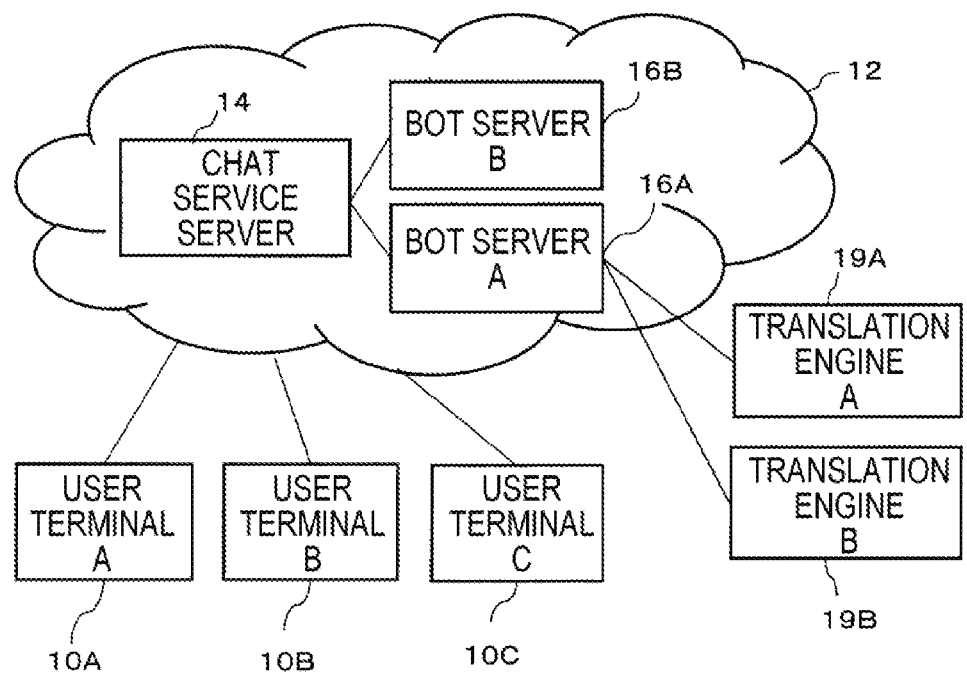
FIG. 24 is a system configuration diagram according to a fifth modification.

FIG. 24 is a system configuration diagram when a translation service is executed, Unlike FIG. 1, a translation engine A (19A) and a translation engine B (19B) are provided instead of the printer A (18A) and the printer B (18B). The translation engine A is a software robot program that translates Japanese into English, and the translation engine B is a software robot program that translates Japanese into Chinese.

Figure 25:
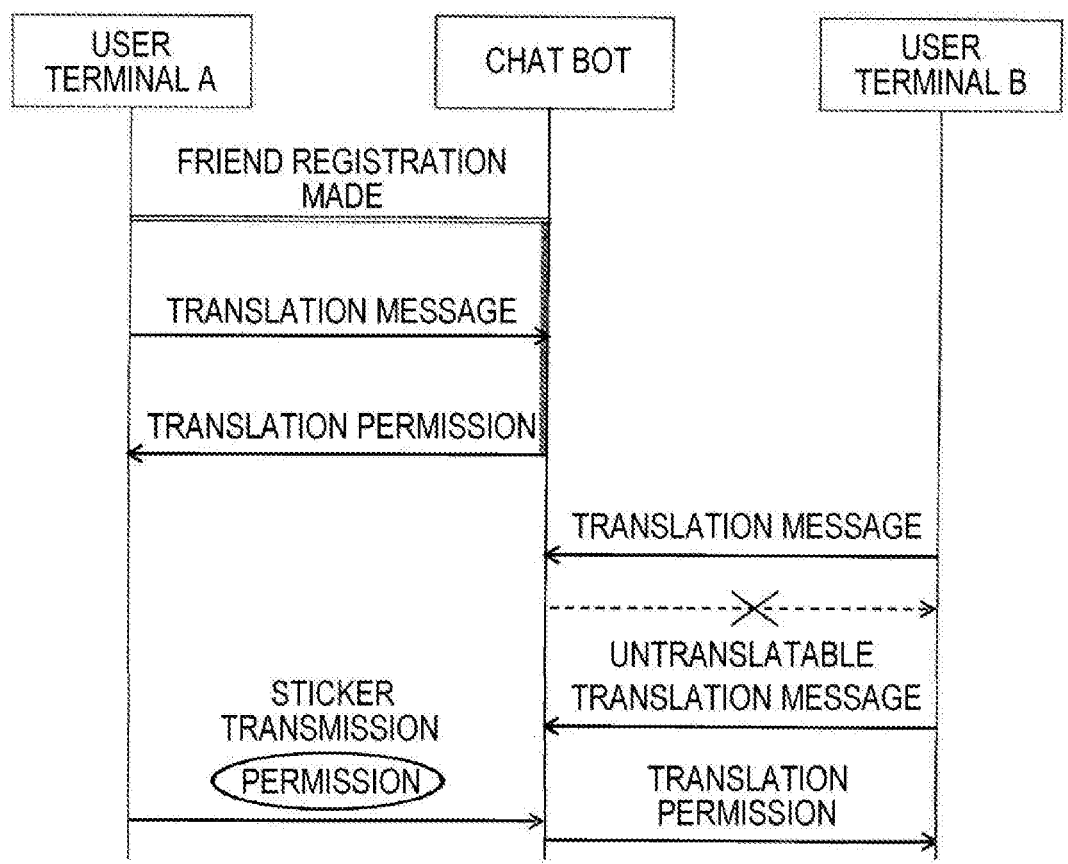
FIG. 25 is a view for explaining a process according to the fifth modification.

FIG. 25 is a sequence diagram of this modification. This is a process performed among the user terminal A operated by the user A, the user terminal B operated by the user B, and the chatbot. It is assumed that the user A, the user B, and the chatbot exist in the same group chat, that the user A has registered the chatbot as a friend, and that the user B has not registered the chatbot as a friend.

The user B transmits a message to be translated to the chatbot. In this state, a permission sticker does not exist. Therefore, the chatbot does not execute a translation service. When the permission sticker 202 is transmitted from the user A, the permission sticker 202 associated with a service request message exists. Thus, the chatbot creates and responds with a message saying "OK. Translation will be done" and executes the translation service with a translation engine.

Sixth Modification

In the fourteenth to twenty-third exemplary embodiments, the chatbot executes the print service when receiving a message to permit printing from the user A who has registered the chatbot as a friend in response to the print instruction from the user B who has not registered the chatbot as a friend. Examples of the message to permit printing from the user A include not only an explicit permission message but also an implicit message. For example, the print service may be executed when the user A views a holding notification from the chatbot or when the user A operates a specific button indicating that the user A has viewed the holding notification. Further, the expression "viewing" also includes a state where a message has been "read".

Seventh Modification

In the fourteenth to twenty-third exemplary embodiments, the chatbot ignores or puts on hold a print instruction from a user who has registered the chatbot as a friend. Alternatively, the chatbot may put the print instruction from the user who has registered the chatbot as a friend in a hold state, and when the chatbot receives a print permission message from another user who has registered the chatbot as a friend, the chatbot may release the holding state and execute the print service. For example, when the user A instructs printing of a message history in the group chat and when the user C permits this, the chatbot may release the holding state of the print instruction and execute the print service.

Eighth Modification

In the fourteenth to twenty-third exemplary embodiments, the examples in which the chatbot provides the print service according to a message from a user has been described. The chatbot may provide any other services. Examples of the other services are described in the above modifications.

In the system illustrated in FIG. 24, the user A selects the translation engine A, sets a format that an original Japanese is displayed following an English translation, and registers this format as setting information. For example, when the user A transmits a message in Japanese language indicating "今日は空いていますか?" to the chatbot, the chatbot drives the translation engine A to automatically respond with a message saying "Are you free today?" "今日は空いていますか?".

On the other hand, even when the user B who has not registered the chatbot as a friend transmits a message to the chatbot, the chatbot does not provide the translation service in automatic response to this message.

Figure 38:
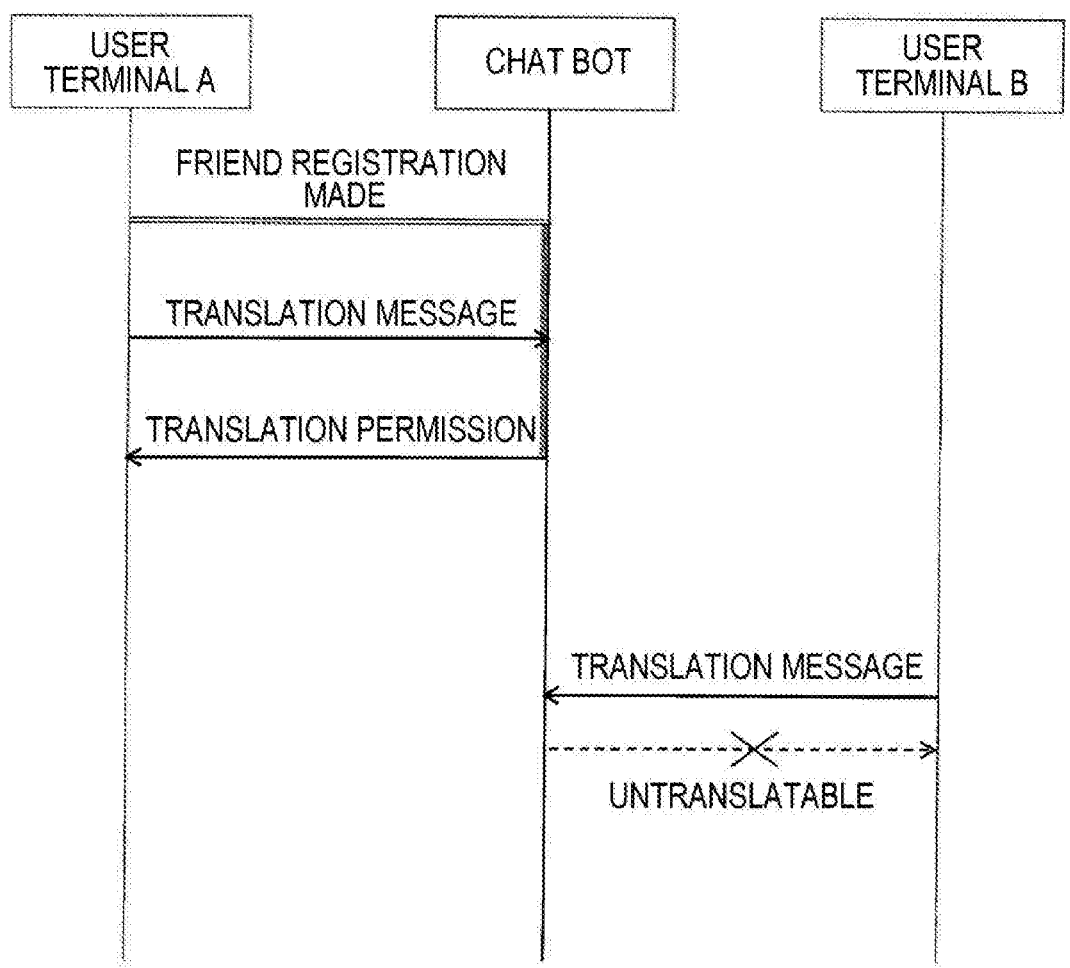
FIG. 38 is a sequence diagram according to a modification.

FIG. 38 is a sequence diagram of the eighth modification. This is a process performed among the user terminal A operated by the user A, the user terminal B operated by the user B, and the chatbot. It is assumed that the user A, the user B. and the chatbot exist in the same group chat, that the user A has registered the chatbot as a friend, and that the user B has not registered the chatbot as a friend.

The user A operates the user terminal A to register the chatbot as a friend. The chatbot stores a user ID of the user who has registered the chatbot as a friend in the user information storage unit 165.

Next, the user A transmits a message to be translated to the chatbot. The chatbot extracts the user ID included in the message from the user A. When the chatbot determines that the user A is a user who has registered the chatbot as a friend, the chatbot executes a translation service using a translation engine associated with the user A in automatic response to the message. For example, the chatbot translates a Japanese language message into an English language message and automatically responds to the user A.

On the other hand, when the user B transmits a message to be translated to the chatbot, the chatbot extracts the user ID included in the message from the user B. When the chatbot determines that the user B is a user who has not registered the chatbot as a friend, the chatbot does not provide the translation service in automatic response to the message but ignores the message of the translation. As a result, the user B does not enjoy the translation service by the chatbot.

As in the above-described fourteenth to twenty-third exemplary embodiments, the chatbot may execute the translation service for the user B according to a permission message from a user who has registered the chatbot as a friend.

Figure 39:
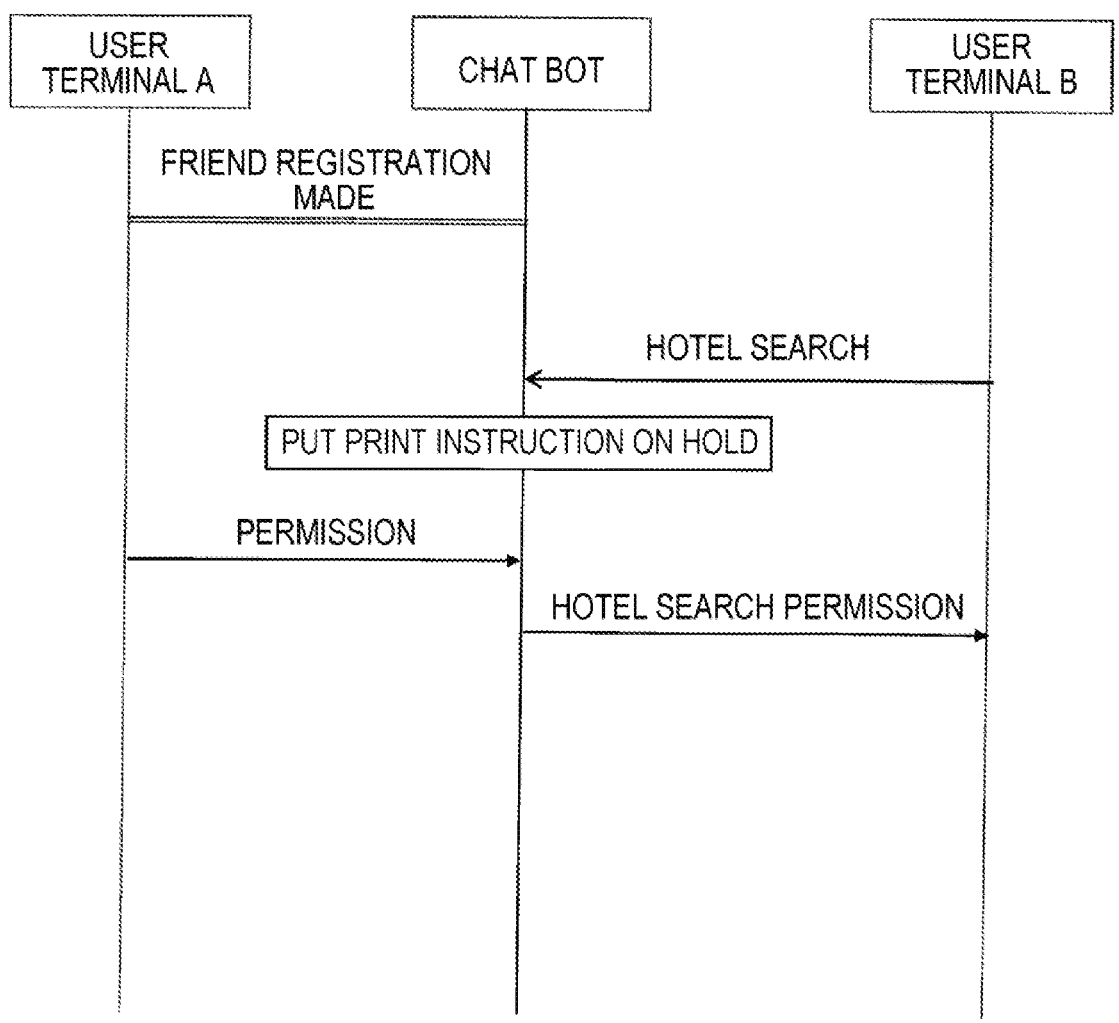
FIG. 39 is a sequence diagram according to another modification.

FIG. 39 is a sequence diagram when the chatbot provides an accommodation facility search service.

The user A operates the user terminal A to register the chatbot as a friend. The chatbot stores the user ID of the user who has registered the chatbot as a friend in the user information table of the user information storage unit 165.

On the other hand, when the user B transmits a message saying "Search hotel" together with a document to the chatbot, the chatbot extracts the user ID included in the message from the user B, refers to the user information table and determines that the user B is a user who has not registered the chatbot as a friend. Then, the chatbot does not execute the search service in automatic response to the message and puts the message saying "Search hotel" on hold. The "Search hotel" message from the user B is also viewed by the user A participating in the group chat. Therefore, when the user A who has registered the chatbot as a friend permits the search by transmitting a message of "OK" in response to the message of "search hotel" of the user B while the search instruction is on hold, the chatbot releases the holding state of the search instruction of the user B in accordance with the message from the user A and executes the search service.

The foregoing description of the exemplary embodiments of the present invention been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A message providing apparatus comprising:
   a receiver configured to receive a service request message for a software robot program configured to operate on a message service exchanging messages between users and configured to exchange messages with the users;
   at least one processor configured to implement:
      a usage right granting unit configured to grant a usage right to a user who has performed a specific operation on the software robot program;
      a permission information providing unit configured to provide service permission information to the user to whom the usage right is granted; and
      a controller configured to, if the receiver receives the service request message, control execution and non-execution of a service according to presence or absence of the service permission information associated with the service request message.

2. The message providing apparatus according to claim 1, wherein:
   the controller is configured to, if a user who has transmitted the service request message is a user having the usage right, execute the service even without the service permission information, and
   the controller is configured to, if the user who has transmitted the service request message is a user who does not have the usage right and if the service permission information associated with the service request message is absent, control the service not to be executed.

3. The message providing apparatus according to claim 1, wherein the service permission information is not attached to but is independent from the user having the usage right.

4. The message providing apparatus according to claim 3, wherein the controller is configured to, if the service permission information is transmitted within a predetermined period of time after the service request message, execute the service according to the service request message.

5. The message providing apparatus according to claim 1, wherein:
   transferring the usage right between the users not via the software robot program is prohibited, and
   the service permission information is transferable between the users not via the software robot program.

6. The message providing apparatus according to claim 1, wherein the controller is configured to, if the service permission information is transmitted within a predetermined time before the service request message, execute the service according to the service request message.

7. The message providing apparatus according to claim 1, wherein the service permission information includes information about an expiration date of the service permission information or a limit of the number of times the service permission information can be used.

8. The message providing apparatus according to claim 1, wherein:
the permission information providing unit is further to provide cancellation information in addition to the service permission information, and
the controller is configured to control the service not to be executed in response to the service request message if the cancellation information is transmitted.

9. A non-transitory computer readable medium storing a program that, if executed, causes a computer to execute a message providing process, the message providing process comprising:
receiving a service request message for a software robot program configured to operate on a message service exchanging messages between users and configured to exchange messages with the users;
granting a usage right to a user who has performed a specific operation on the software robot program;
providing service permission information to the user to whom the usage right is granted; and
if the service request message is received, controlling execution and non-execution of a service according to presence or absence of the service permission information associated with the service request message.

10. A message providing apparatus comprising:
a receiver configured to receive a service request message for a software robot program configured to operate on a message service exchanging messages between users and configured to exchange messages with the users;
a storage configured to store information of a user having a usage right in response to the user performing a specific operation on the software robot program; and
a controller configured to, if a user who has transmitted the service request message does not have the usage right, control a service not to be executed in response to the service request message.

11. The message providing apparatus according to claim 10, wherein the controller is configured to put the service request message on hold and notify the user who does not have the usage right, of a method that enables the service to be provided.

12. The message providing apparatus according to claim 11, wherein the controller is configured to notify the user who does not have the usage right to prompt the user who does not have the usage right to perform the specific operation.

13. The message providing apparatus according to claim 11, wherein the controller is configured to notify the user who does not have the usage right to prompt the user who does not have the usage right to get permission from a user having the usage right.

14. The message providing apparatus according to claim 11, wherein the controller is configured to notify a user having the usage right of the fact that the service request message is on hold.

15. The message providing apparatus according to claim 14, wherein the controller is configured to, if a group including plural users is created to exchange messages, notify a user having the usage right in the group of the fact that the service request message is on hold.

16. The message providing apparatus according to claim 15, wherein the controller is configured to, if there is no user having the usage right in the group, notify a user having the usage right outside the group of the fact that the service request message is on hold.

17. The message providing apparatus according to claim 16, wherein the controller is configured to notify a user who is specified by a message from the user who does not have the usage right as the user having the usage right outside the group, of the fact that the service request message is on hold.

18. A non-transitory computer readable medium storing a program that, if executed, causes a computer to execute a message providing process, the message providing process comprising:
receiving a service request message for a software robot program configured to operate on a message service exchanging messages between users and configured to exchange messages with the users;
storing information of a user having a usage right in response to the user performing a specific operation on the software robot program; and
if a user who has transmitted the service request message does not have the usage right, controlling a service not to be executed in response to the service request message.

* * * * *